(12) United States Patent
Nomura et al.

(10) Patent No.: US 6,888,685 B2
(45) Date of Patent: May 3, 2005

(54) RETRACTING MECHANISM OF A ZOOM LENS BARREL

(75) Inventors: Hiroshi Nomura, Saitama (JP); Yoshihiro Yamazaki, Saitama (JP); Isao Okuda, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/771,300

(22) Filed: Feb. 5, 2004

(65) Prior Publication Data

US 2004/0160678 A1 Aug. 19, 2004

(30) Foreign Application Priority Data

Feb. 6, 2003 (JP) ........................................ 2003-029644

(51) Int. Cl.[7] .................... G02B 15/14; G02B 7/02; G03B 17/00; H04N 5/262
(52) U.S. Cl. .................... 359/701; 359/694; 359/695; 359/699; 359/676; 359/689; 359/823; 396/72; 396/79; 396/85; 396/87; 348/240.3
(58) Field of Search .................... 359/701, 694, 359/695, 696, 699, 700, 703, 704, 823, 676, 689; 396/72, 79, 85, 87, 349; 348/240.3

(56) References Cited

U.S. PATENT DOCUMENTS

| | | | |
|---|---|---|---|
| 5,450,242 A | 9/1995 | Kohmoto et al. | ........... 359/676 |
| 5,488,513 A | 1/1996 | Tanaka | ........... 359/699 |
| 5,589,987 A | 12/1996 | Tanaka | ........... 359/701 |
| 5,636,063 A | 6/1997 | Kohmoto et al. | ........... 359/703 |
| 5,646,790 A | 7/1997 | Kohmoto et al. | ........... 359/823 |
| 6,104,550 A | 8/2000 | Azegami et al. | ........... 359/696 |
| 6,469,840 B2 * | 10/2002 | Nomura et al. | ........... 359/699 |
| 6,469,841 B2 * | 10/2002 | Nomura et al. | ........... 359/699 |
| 6,747,807 B2 * | 6/2004 | Iikawa et al. | ........... 359/694 |
| 6,753,911 B1 * | 6/2004 | Yamada et al. | ........... 348/240.3 |
| 6,795,251 B2 * | 9/2004 | Nomura et al. | ........... 359/694 |

FOREIGN PATENT DOCUMENTS

| | | |
|---|---|---|
| JP | 7-53056 | 12/1995 |
| JP | 2537398 | 7/1996 |

* cited by examiner

*Primary Examiner*—Loha Ben
(74) *Attorney, Agent, or Firm*—Greenblum & Bernstein, P.L.C.

(57) ABSTRACT

A retracting mechanism of a zoom lens barrel includes first, second and third lens groups, wherein the first and third lens groups are integrally moved along an optical axis during variation of a focal length, and wherein at least one of the first and third lens groups is moved relative to the other to reduce a distance therebetween when the zoom lens barrel is fully retracted. The retracting mechanism includes first, second and third lens group moving rings; a cam mechanism for independently moving the first and second lens group moving rings; a second lens group support frame; an intermediate member fixed to the second lens group support frame; and a biasing device for biasing the third lens group moving ring away from the first lens group moving ring. The biasing device functions between the intermediate member and the third lens group moving ring.

9 Claims, 19 Drawing Sheets

RETRACTING MECHANISM OF A ZOOM LENS BARREL

BACKGROUND OF THE INVENTION

1. Field of the Invention

The present invention relates to a retracting mechanism of a zoom lens barrel.

2. Description of the Related Art

A zoom lens system including a first lens group, a second lens group and a third lens group in that order from the object side, wherein the first lens group and the third lens group are integrally moved along an optical axis during a variation of a focal length, is known in the art. A retractable zoom lens barrel including such a type of zoom lens system, wherein a integral movement relationship between the first lens group and the third lens group is canceled to bring the first lens group close to the second and third lens groups to reduce the length of the zoom lens barrel when it is retracted to a retracted position (full-retracted position or a power-off position), is also known in the art. In general, a compression coil spring for biasing the second lens group and the third lens group in opposite directions away from each other is installed therebetween so that the third lens group is moved rearward to its rear moving limit relative to the first lens group by the spring force of the compression coil spring to establish the aforementioned integral movement relationship between the first lens group and the third lens group when the focal length of the zoom lens system is varied (when the zoom lens barrel is in a ready-to-photograph state), and so that the third lens group is brought close to the second lens group (and the first lens group) by compressing the compression coil spring when the zoom lens barrel is retracted to the retracted position.

The inventors of the present invention have found that a further reduction in length of the zoom lens barrel is possible in the aforementioned type of zoom lens barrel.

SUMMARY OF THE INVENTION

The present invention provides a retracting mechanism for a zoom lens barrel including the aforementioned type of zoom lens system, in which the first lens group and the third lens group are integrally moved along an optical axis during a variation of a focal length, wherein the retracting mechanism further reduces the length of the zoom lens barrel possible.

According to an aspect of the present invention, a retracting mechanism of a zoom lens barrel is provided, including a first lens group, a second lens group and a third lens group, in that order from an object side, wherein the first lens group and the third lens group are integrally moved along an optical axis during a variation of a focal length, and wherein at least one of the first lens group and the third lens group is moved relative to the other to reduce a distance therebetween when the zoom lens barrel is fully retracted. The retracting mechanism includes a first lens group moving ring, for supporting the first lens group, which is linearly guided along the optical axis; a second lens group moving ring, for supporting the second lens group, which is linearly guided along the optical axis; a third lens group moving ring, for supporting the third lens group, which is linearly guided along the optical axis, the third lens group moving ring being allowed to approach the first lens group moving ring and being prevented from moving away from the first lens group moving ring beyond a moving limit relative to the first lens group moving ring; a cam mechanism for moving the first lens group moving ring and the second lens group moving ring in respective moving manners independent of each other along the optical axis; a second lens group support frame which supports the second lens group; an intermediate member which is supported by the second lens group moving ring to be movable along the optical axis while being prevented from moving forward beyond a forward moving limit of the second lens group support frame relative to the second lens group moving ring, the second lens group support frame being screw-engaged into the intermediate member; and a biasing device for biasing the third lens group moving ring in a direction away from the first lens group moving ring. The biasing device functions between the intermediate member and the third lens group moving ring.

It is desirable for the second lens group moving ring to include an inner flange which projects radially inwards, wherein the second lens group support frame includes an outer flange which projects radially outwards, wherein the forward moving limit of the second lens group support frame is determined by contact of the intermediate member, which is biased forward by the biasing device, with a rear surface of the inner flange when the zoom lens barrel is in a ready-to-photograph position. The first lens group moving ring presses the outer flange rearward to move the second lens group support frame rearward together with the intermediate member against a biasing force of the biasing device.

It is desirable for the second lens group to serve as a lens group for a zooming adjustment, wherein the second lens group support frame, to which the second lens group is fixed, is fixed to the intermediate member upon a position of screw-engagement between the second lens group support frame and the intermediate member is adjusted.

It is desirable for the first lens group to be a frontmost lens group of the zoom lens barrel.

It is desirable for the zoom lens barrel to be a vari-focal type in which a focal point slightly varies when the focal length is varied, wherein the zoom lens barrel further includes a fourth lens group which is positioned behind the third lens group to be guided along the optical axis. The fourth lens group is moved along the optical axis to make an adjustment to a slight focus deviation caused by the variation of the focal length.

It is desirable for the first lens group, the second lens group, the third lens group and the fourth lens group to be a positive lens group, a negative lens group, a positive lens group and a positive lens group, respectively.

It is desirable for the fourth lens group to be moved along the optical axis to perform a focusing operation.

It is desirable for the cam mechanism to include a cam ring which is positioned around the second lens group moving ring to be rotatable relative to the second lens group moving ring, and includes a plurality of outer cam grooves formed on an outer peripheral surface of the cam ring, and a plurality of inner cam grooves formed on an inner peripheral surface of the cam ring; a plurality of inward cam followers which project radially inwards from the first lens group moving ring to be engaged in the plurality of outer cam grooves, respectively; and a plurality of outward cam followers which project radially outwards from the second lens group moving ring to be engaged in the plurality of inner cam grooves, respectively.

It is desirable for the retracting mechanism to include a linear guide mechanism, positioned between the second lens group moving ring and the intermediate member, for guiding the intermediate member linearly along the optical axis without rotating the intermediate member relative to the second lens group moving ring.

The present disclosure relates to subject matter contained in Japanese Patent Application No. 2003-029644 (filed on Feb. 6, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
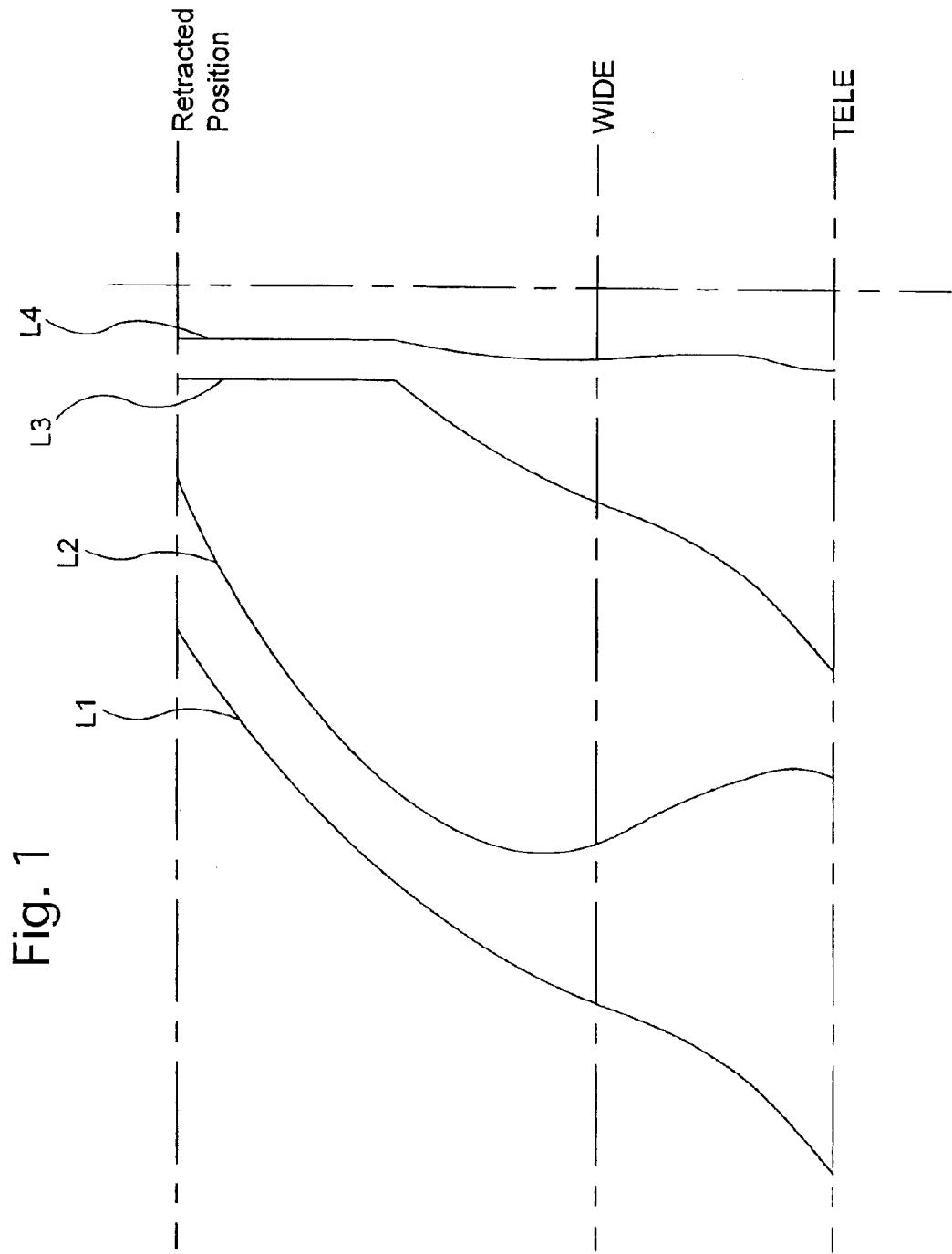
FIG. 1 is a diagram showing reference moving paths of zoom lens groups of a zoom lens system provided in an embodiment of a zoom lens barrel according to the present invention.
Figure 2:
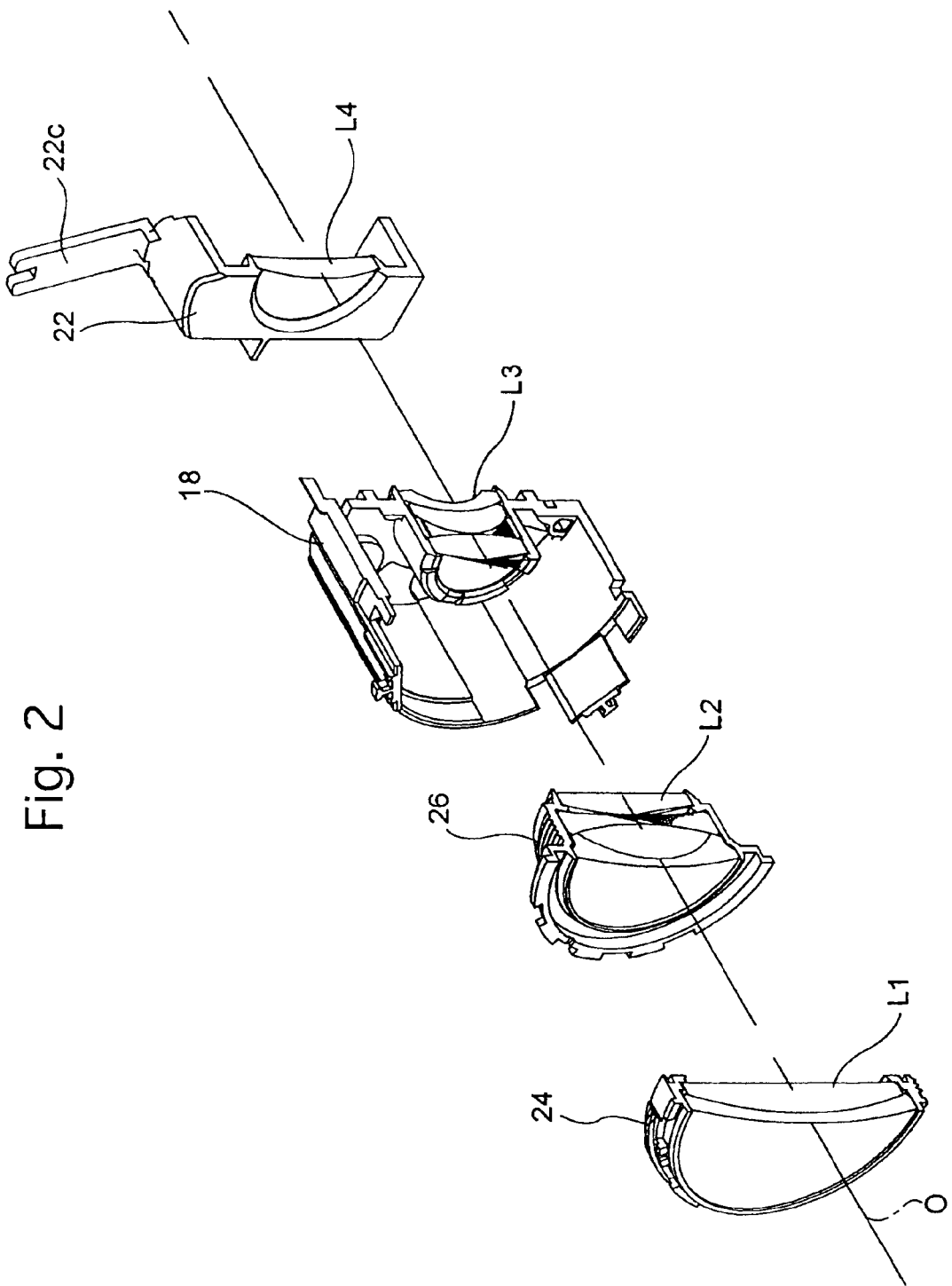
FIG. 2 is an exploded perspective view in axial section of the zoom lens groups and lens support frames therefor.

First of all, a zoom lens system (zoom lens optical system) provided in an embodiment of a zoom lens barrel of a camera according to the present invention will be hereinafter discussed with reference to FIGS. 1 through 5. The zoom lens system of the zoom lens barrel 10 is a vari-focal lens system consisting of four lens groups: a positive first lens group L1, a negative second lens group L2, a positive third lens group L3 and a positive fourth lens group L4, in that order from the object side (left side as viewed in FIG. 3). The first through third lens groups L1, L2 and L3 are moved relative to one another along an optical axis O to vary the focal length of the zoom lens system and the fourth lens group L4 is moved along the optical axis O to make a slight focus adjustment, i.e., to adjust a slight focus deviation caused by the variation of the focal length. During the operation of varying the focal length of the zoom lens system between wide angle and telephoto, the first lens group L1 and the third lens group L3 move along the optical axis while maintaining the distance therebetween. The fourth lens group L4 also serves as a focusing lens group. FIG. 1 shows both moving paths of the first through fourth lens groups L1 through L4 during the zooming operation and moving paths for advancing/retracting operation. By definition, a vari-focal lens is one whose focal point slightly varies when varying the focal length, and a zoom lens is one whose focal point does not vary substantially when varying the focal length. However, the vari-focal lens system of the present invention is also hereinafter referred to as a zoom lens system.

Figure 8:
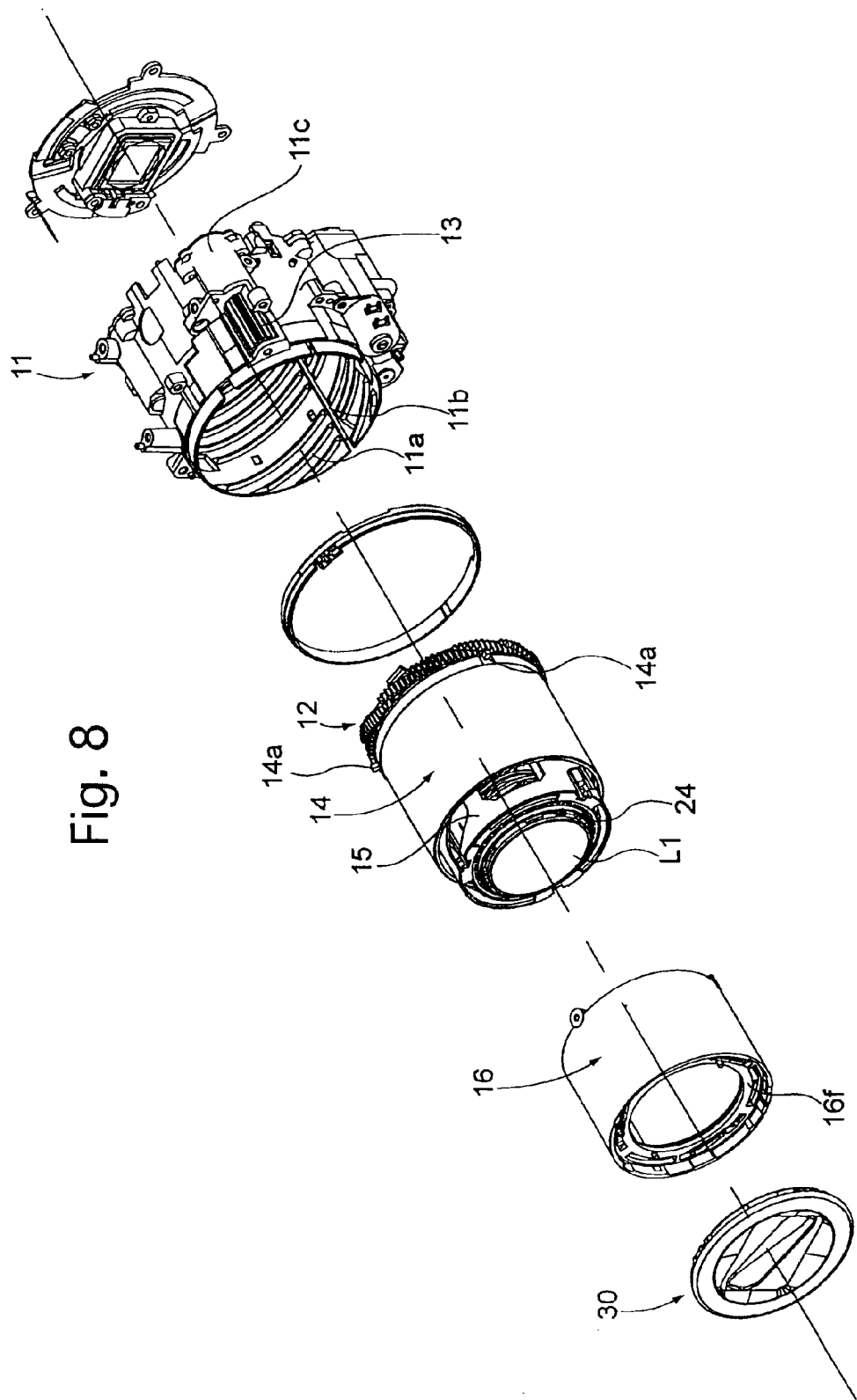
FIG. 8 is an exploded perspective view of a portion of the zoom lens barrel shown in FIG. 3.
Figure 9:
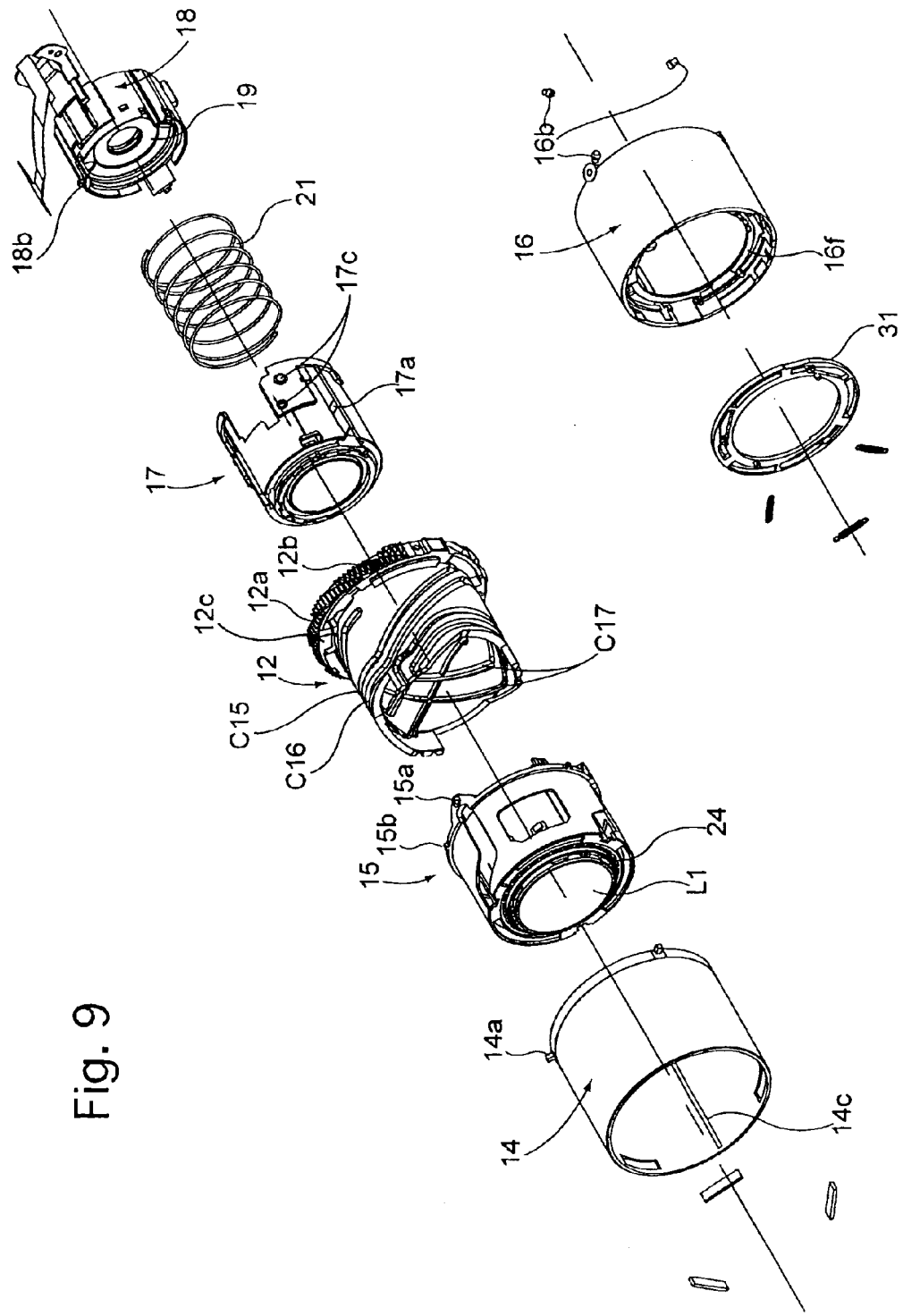
FIG. 9 is an exploded perspective view of a portion of the zoom lens barrel shown in FIG. 3.
Figure 10:
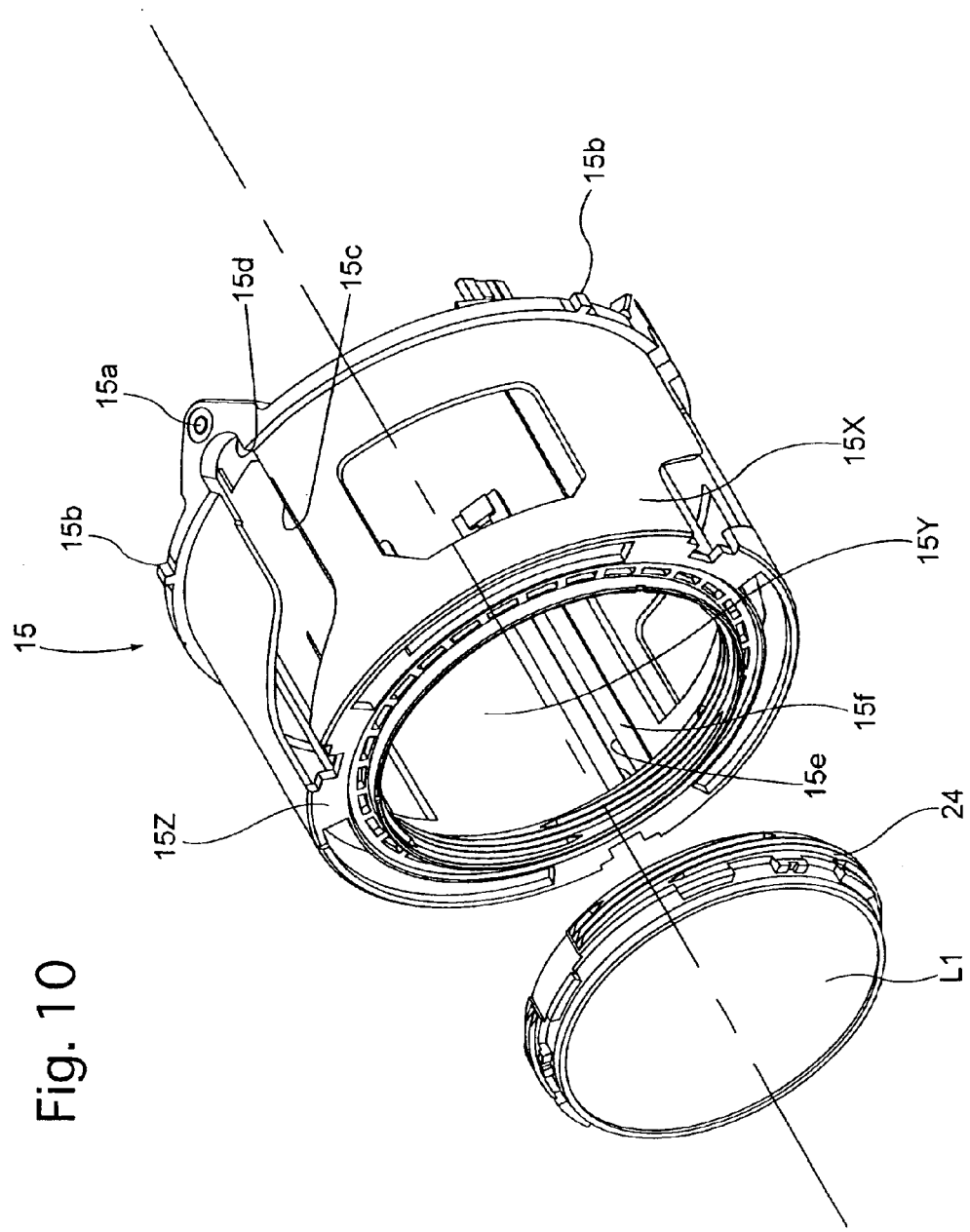
FIG. 10 is an exploded perspective view of a portion of the zoom lens barrel shown in FIG. 3, showing a first lens group moving ring and peripheral elements.
Figure 15:
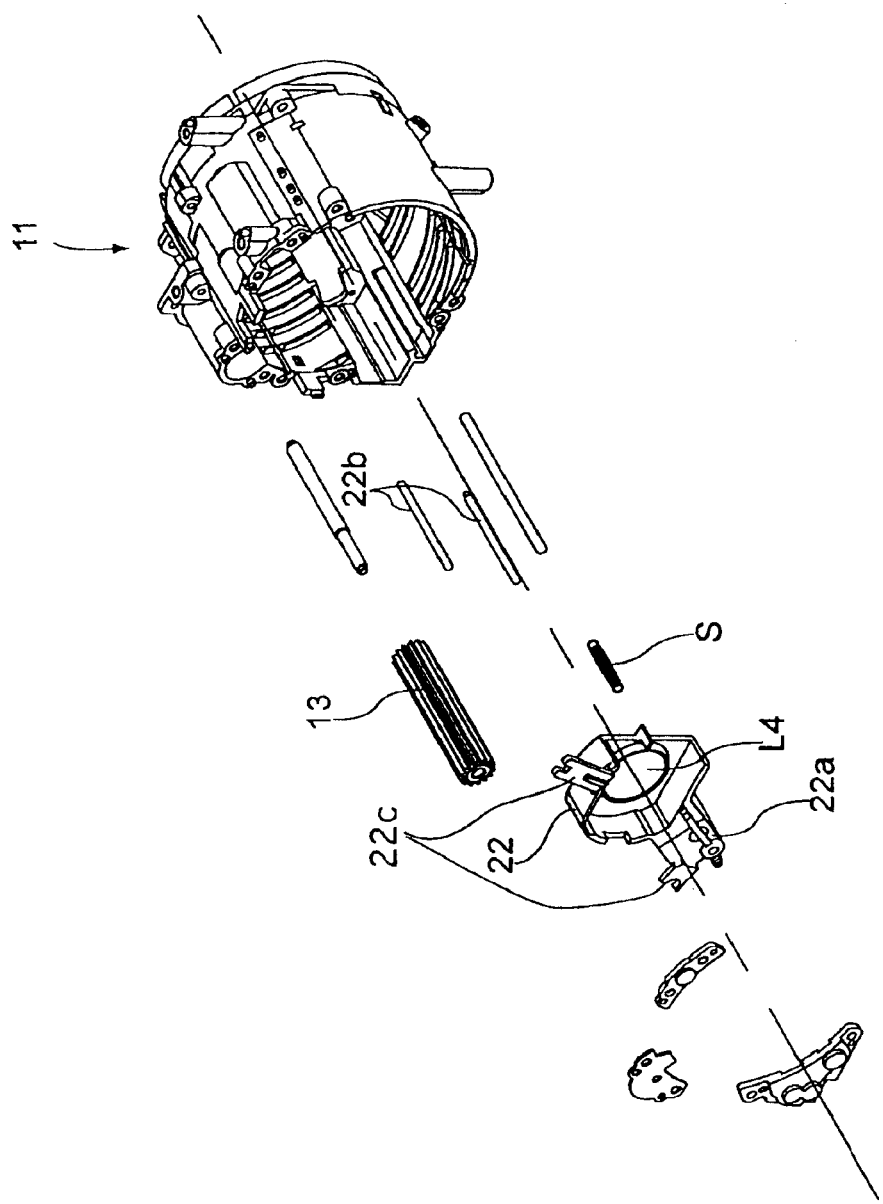
FIG. 15 is an exploded perspective view of a portion of the zoom lens barrel shown in FIG. 3, showing the stationary barrel, a fourth lens group and peripheral elements.

The overall structure of the zoom lens barrel 10 will be hereinafter discussed with reference to FIGS. 1 through 19. The zoom lens barrel 10 is provided with a stationary barrel 11 which is fixed to a camera body (not shown). As shown in FIG. 8, the stationary barrel 11 is provided on an inner peripheral surface thereof with a female helicoid 11a and a set of three linear guide grooves 11b which extend parallel to the optical axis O. The zoom lens barrel 10 is provided inside the stationary barrel 11 with a cam/helicoid ring (cam ring) 12. As shown in FIG. 9, the cam/helicoid ring 12 is provided, on an outer peripheral surface thereof in the vicinity of the rear end of the cam/helicoid ring 12, with a male helicoid 12a which is engaged with the female helicoid 11a of the stationary barrel 11. The cam/helicoid ring 12 is provided on the thread of the male helicoid 12a with a spur gear 12b which is always engaged with a drive pinion 13 (see FIG. 15). The drive pinion 13 is provided in a recessed portion 11c (see FIG. 3) formed on an inner peripheral surface of the stationary barrel 11. The drive pinion 13 is supported by the stationary barrel 11 to be freely rotatable in the recessed portion 11c on an axis of the drive pinion 13. Accordingly, forward and reverse rotations of the drive pinion 13 cause the cam/helicoid ring 12 to move forward rearward along the optical axis O while rotating about the optical axis O due to the engagement of the drive pinion 13 with the spur gear 12b and the engagement of the female helicoid 11a with the male helicoid 12a. In the present embodiment of the zoom lens barrel 10, the cam/helicoid ring 12 is the only element thereof which rotates about the optical axis O.

The zoom lens barrel 10 is provided around the cam/helicoid ring 12 with a linear guide ring 14. The linear guide ring 14 is provided, on an outer peripheral surface thereof at the rear end of the linear guide ring 14, with a set of three linear guide projections 14a which project radially outwards to be engaged in the set of three linear guide grooves 11b of the stationary barrel 11, respectively. The linear guide ring 14 is provided, on an inner peripheral surface thereof at the rear end of the linear guide ring 14, with a set of three bayonet lugs 14b (only one of them appears in FIGS. 1 through 4). The cam/helicoid ring 12 is provided, on an outer peripheral surface thereof immediately in front of the male helicoid 12a (the spur gear 12b), with a circumferential groove 12c in which the set of three bayonet lugs 14b are engaged to be rotatable about the optical axis O in the circumferential groove 12c. Accordingly, the linear guide ring 14 is linearly movable along the optical axis O together with the cam/helicoid ring 12 without rotating about the optical axis O.

Figure 4:
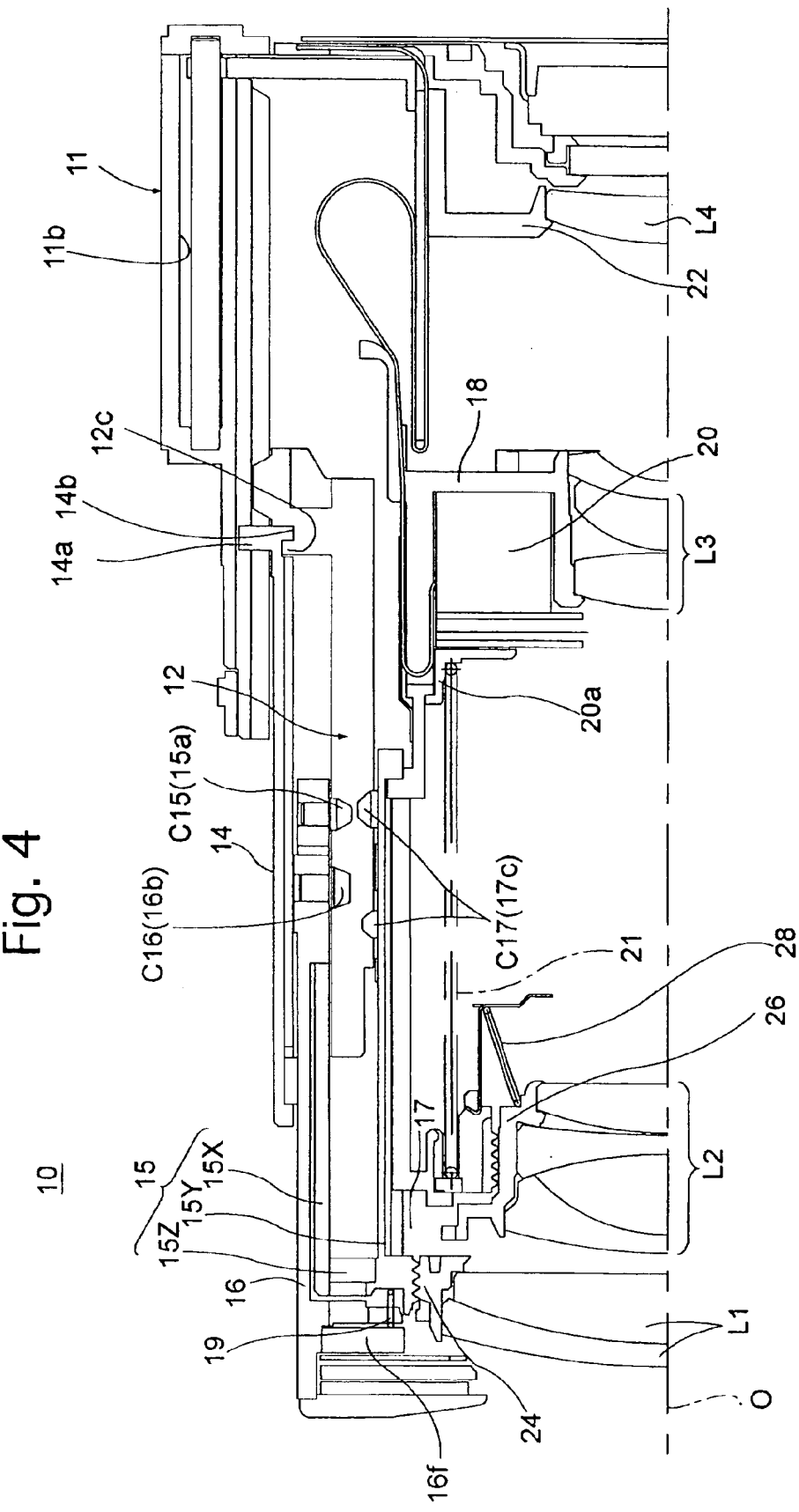
FIG. 4 is a view similar to that of FIG. 3, and shows an upper half of the zoom lens barrel from the optical axis thereof at the wide-angle extremity.
Figure 16:
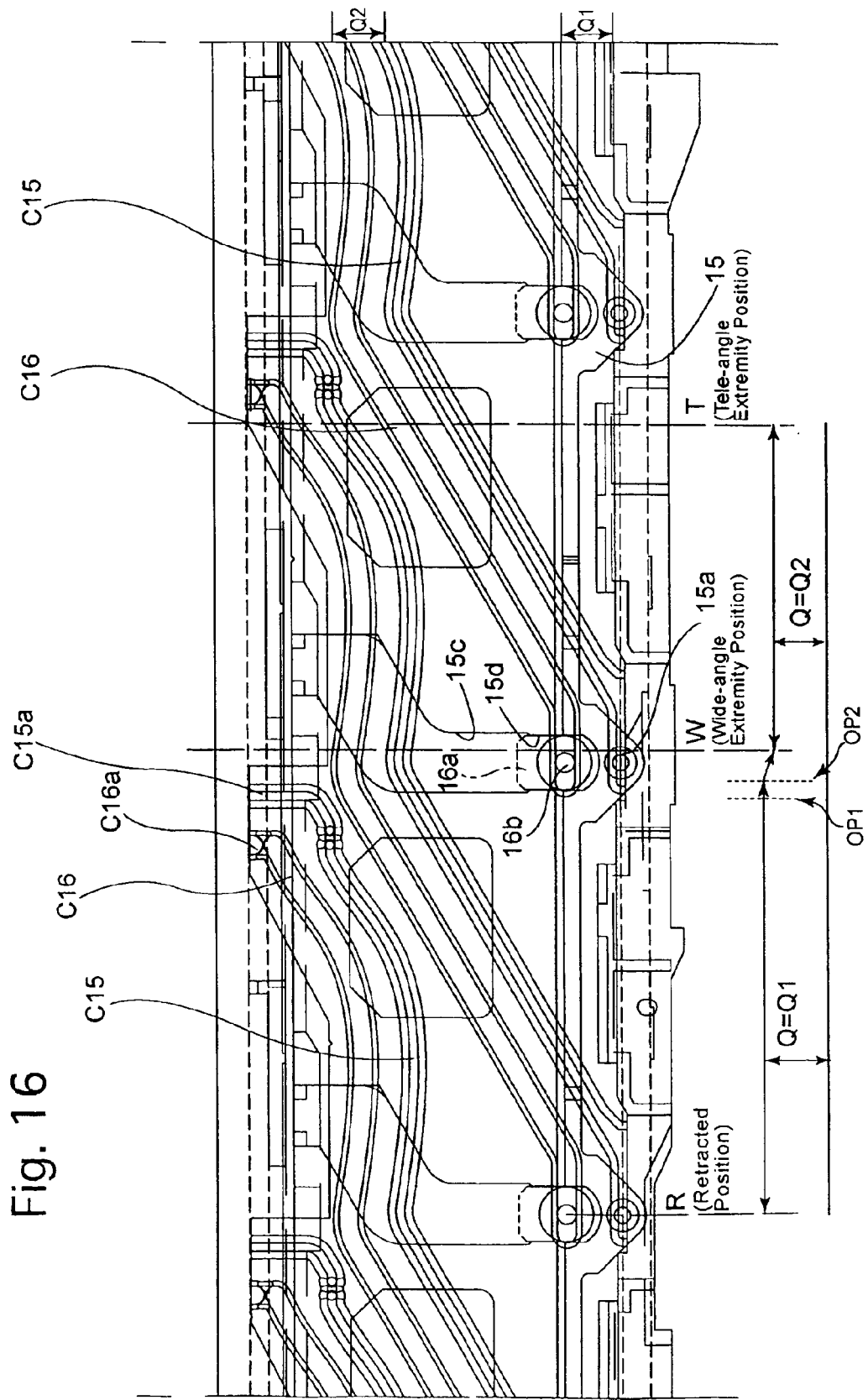
FIG. 16 is a developed view of a cam/helicoid ring, showing a set of first cam grooves of the cam/helicoid ring for moving the first lens group and a set of third cam grooves of the cam/helicoid ring for moving an exterior ring.

The zoom lens barrel 10 is provided around the cam/helicoid ring 12 with a first lens group moving ring (first lens frame) 15 which supports the first lens group L1, and is further provided around the first lens group moving ring 15 with an exterior ring 16 serving as a light shield member. The zoom lens barrel 10 is provided inside the cam/helicoid ring 12 with a second lens group moving ring (second lens frame) 17 which supports the second lens group L2. As shown in FIGS. 4, 9 and 16, the cam/helicoid ring 12 is provided on an outer peripheral surface thereof with a set of three first cam grooves C15 for moving the first lens group moving ring 15 and a set of three third cam grooves C16 for moving the exterior ring 16, and is further provided on an inner peripheral surface of the cam/helicoid ring 12 with a set of six second cam grooves C17 for moving the second lens group moving ring 17 (see FIG. 19). The set of three first cam grooves C15 and the set of three third cam grooves C16 are slightly different in shape, and are apart from one another at predetermined intervals in a circumferential direction of the cam/helicoid ring 12. The set of six second cam grooves C17 have the same basic cam diagrams, and includes three front second cam grooves C17, and three rear second cam grooves C17 which are positioned behind the three front second cam grooves C17 in the optical axis direction (vertical direction as viewed in FIG. 19), respectively; the three front second cam grooves C17 are apart from one another in a circumferential direction of the cam/helicoid ring 12 while the three rear second cam grooves C17 are apart from one another in a circumferential direction of the cam/helicoid ring 12. Each of the first lens group moving ring 15, the exterior ring 16 and the second lens group moving ring 17 is linearly guided along the optical axis O. A rotation of the cam/helicoid ring 12 causes the first lens group moving ring 15, the exterior ring 16 and the second lens group moving ring 17 to move along the optical axis O in accordance with the contours of the set of three first cam grooves C15, the set of three third cam grooves C16 and the set of six second cam grooves C17, respectively.

Figure 5:
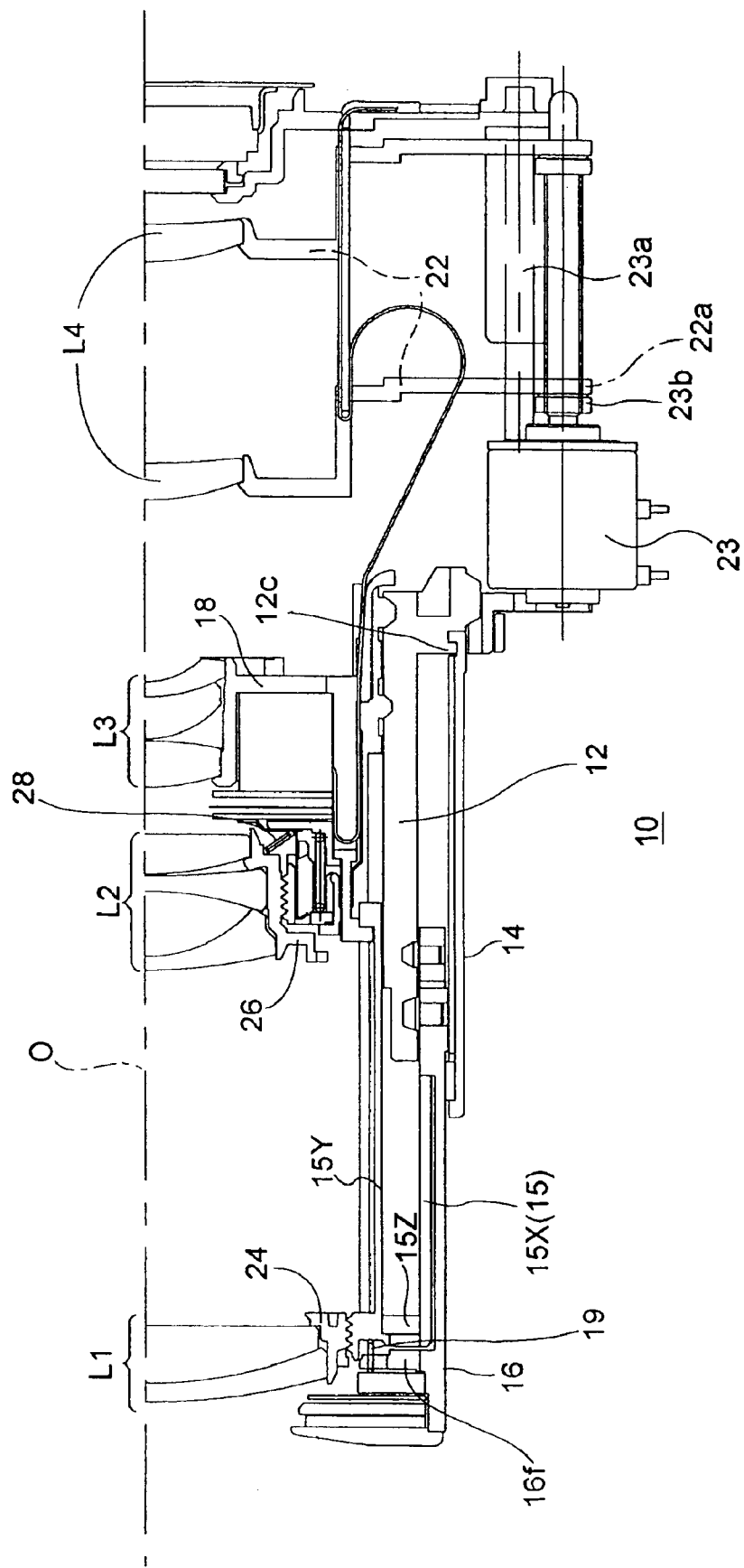
FIG. 5 is a view similar to that of FIG. 3, and shows a lower half of the zoom lens barrel from the optical axis thereof at the telephoto extremity.

Linear guide mechanical linkages among the first lens group moving ring 15, the exterior ring 16 and the second lens group moving ring 17 will be discussed hereinafter. As shown in FIGS. 4 and 5, the first lens group moving ring 15 is provided with an outer ring portion 15X, an inner ring portion 15Y and a flange wall 15Z by which the front end of the outer ring portion 15X and the front end of the inner ring portion 15Y are connected to have a substantially U-shaped cross section. The cam/helicoid ring 12 is positioned between the outer ring portion 15X and the inner ring portion 15Y. Three cam followers 15a which are respectively engaged in the set of three first cam grooves C15 are fixed to the outer ring portion 15X in the vicinity of the rear end thereof. The zoom lens barrel 10 is provided with a first lens group support frame 24 which supports the first lens group L1. As shown in FIGS. 8 and 9, the first lens group support frame 24 is fixed to the inner ring portion 15Y at the front end thereof through a male thread portion and a female thread portion which are formed on an outer peripheral surface of the first lens group support frame 24 and an inner peripheral surface of the inner ring portion 15Y, respectively (see FIG. 10). The first lens group support frame 24 can be rotated relative to the first lens group moving ring 15 to adjust the position of the first lens group support frame 24 along the optical axis O relative to the first lens group moving ring 15 to carry out a zooming adjustment (which is an adjustment operation which is carried out in a manufacturing process of the zoom lens barrel if necessary).

The linear guide ring 14, which is linearly guided along the optical axis O by the stationary barrel 11, is provided, on an inner peripheral surface thereof at approximately equi-angular intervals (intervals of approximately 120 degrees), with a set of three linear guide grooves 14c (only one of them appears in FIG. 9), while the outer ring portion 15X of the first lens group moving ring 15 is provided at the rear end thereof with a set of three linear guide projections 15b (see FIG. 10) which project radially outwards to be engaged in the set of three linear guide grooves 14c, respectively. The outer ring portion 15X is provided with a set of three assembly slots 15c (see FIGS. 10 and 16), and is further provided at the rear ends of the set of three assembly slots 15c with a set of linear guide slots 15d which are communicatively connected with the set of three assembly slots 15c and are smaller in width than the set of three assembly slots 15c, respectively. Three linear guide keys 16a which are fixed to the exterior ring 16 which is positioned between the outer ring portion 15X and the linear guide ring 14 are engaged in the set of linear guide slots 15d, respectively. The maximum relative moving distance between the first lens group moving ring 15 and the exterior ring 16 along the optical axis O (the difference in shape between the set of three first cam grooves C15 and the set of three third cam grooves C16) is only a slight distance, and the length of each linear guide slot 15d in the optical axis direction is correspondingly short. A set of three cam followers 16b which are engaged in the set of three third cam grooves C16 are fixed to the set of three linear guide keys 16a, respectively (see FIGS. 7 and 9).

Figure 3:
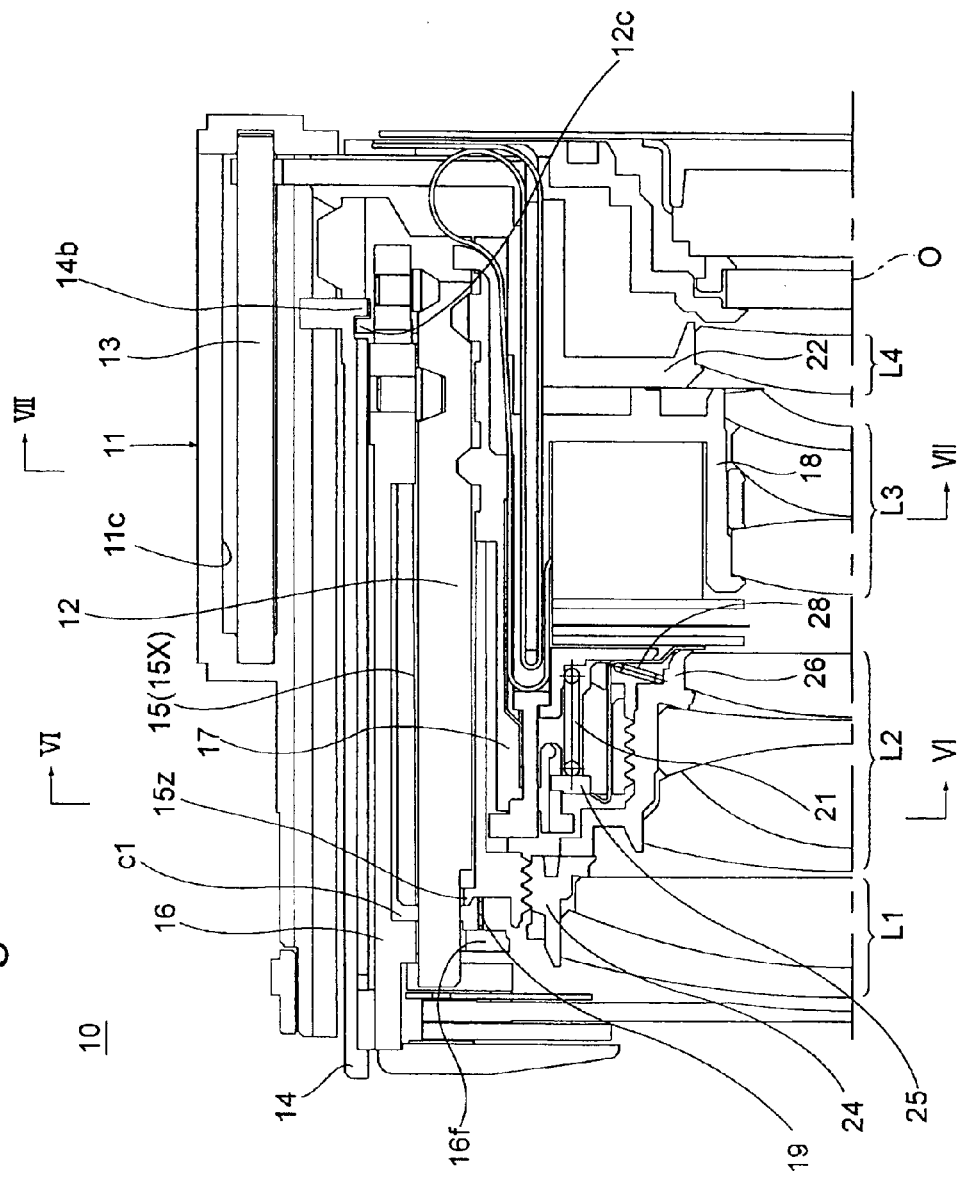
FIG. 3 is a longitudinal cross sectional view of the embodiment of the zoom lens barrel according to the present invention, showing an upper half of the zoom lens barrel from the optical axis thereof in a retracted state.

The zoom lens barrel 10 is provided between the first lens group moving ring 15 and the exterior ring 16 with a compression coil spring 19 (see FIGS. 3 through 5). The compression coil spring 19 biases the first lens group moving ring 15 rearward to remove backlash between the set of three first cam grooves C15 and the set of three cam followers 15a, and at the same time, biases the exterior ring 16 forward to remove backlash between the set of three third cam grooves C16 and the set of three cam followers 16b.

As shown in FIG. 16, the set of three first cam grooves C15 and the set of three third cam grooves C16 are shaped slightly different from each other in their respective retracting positions, as compared with their respective photographing ranges (zooming ranges), so that the exterior ring 16 advances from the photographing position thereof relative to the first lens group moving ring 15 to prevent barrier blades of a lens barrier unit 30 (see FIG. 8) and the first lens group L1 from interfering with each other when the zoom lens barrel 10 is fully retracted as shown in FIG. 3. More specifically, as shown in FIG. 16, the shapes of the first cam grooves C15 and the third cam grooves C16 are determined so that the distance Q in the optical axis direction between the first cam grooves C15 and the third cam grooves C16 in the preparation ranges (i.e., the range between the retracted position and the position at which the lens barrier unit 30 is fully open) is longer than that of the zoom ranges (i.e., the range between the wide-angle extremity and the telephoto extremity). Namely, throughout the entirety of the preparation ranges the distance Q=Q1, however, the distance Q gradually reduces from a position OP2 at a predetermined distance from a fully opened position OP1 of the lens barrier unit 30 (i.e., from a position whereby the first lens group L1 and the lens barrier unit 30 do not interfere with each other), so that the distance Q=Q2 (<Q1) at the wide-angle extremity, and the distance Q=Q2 in the entirety of the zoom ranges.

It can be seen in FIG. 3 that a clearance cl between the flange wall 15Z of the first lens group moving ring 15 and a flange wall 16f of the exterior ring 16 when the zoom lens barrel 10 is in the retracted position is greater than that when the zoom lens barrel 10 is in a ready-to-photograph position as shown in FIG. 4 or 5. In other words, when the zoom lens barrel 10 is in a ready-to-photograph position as shown in FIG. 4 or 5, the flange wall 15Z of the first lens group moving ring 15 and the flange wall 16f of the exterior ring 16 are positioned closely to each other to reduce the length of the zoom lens barrel 10. The lens barrier unit 30 is supported by the exterior ring 16 at the front end thereof. The zoom lens barrel 10 is provided, immediately behind the lens barrier unit 30 (between the lens barrier unit 30 and the flange wall 16f of the exterior ring 16), with a barrier opening/closing ring 31 (see FIG. 9). Rotating the barrier opening/closing ring 31 at the retracted position via rotation of the cam/helicoid ring 12 causes the barrier blades of the lens barrier unit 30 to open and shut. The mechanism for opening and closing the barrier blades using a barrier opening/closing ring such as the barrier opening/closing ring 31 is known in the art.

Note that in the illustrated embodiment, although the shapes of the first cam grooves C15 and the third cam grooves C16 are determined so that the distance Q (i.e., Q2) is constant (unchanging) over the entire zoom range, the distance Q (i.e., Q2) can be determined so as to change in accordance with the focal length. Furthermore, the distance Q2 over the zoom range can be determined so as to be greater than the distance Q1 over the preparation range.

The front end of each third cam groove C16 is open on a front end surface of the cam/helicoid ring 12 to be formed as an open end C16a (see FIG. 16) through which the associated cam follower 16b of the exterior ring 16 is inserted into the third cam groove C16. Likewise, the front end of each first cam groove C15 is open on a front end surface of the cam/helicoid ring 12 to be formed as an open end C15a (see FIG. 16) through which the associated cam follower 15a of the first lens group moving ring 15 is inserted into the first cam groove C15.

Figure 6:
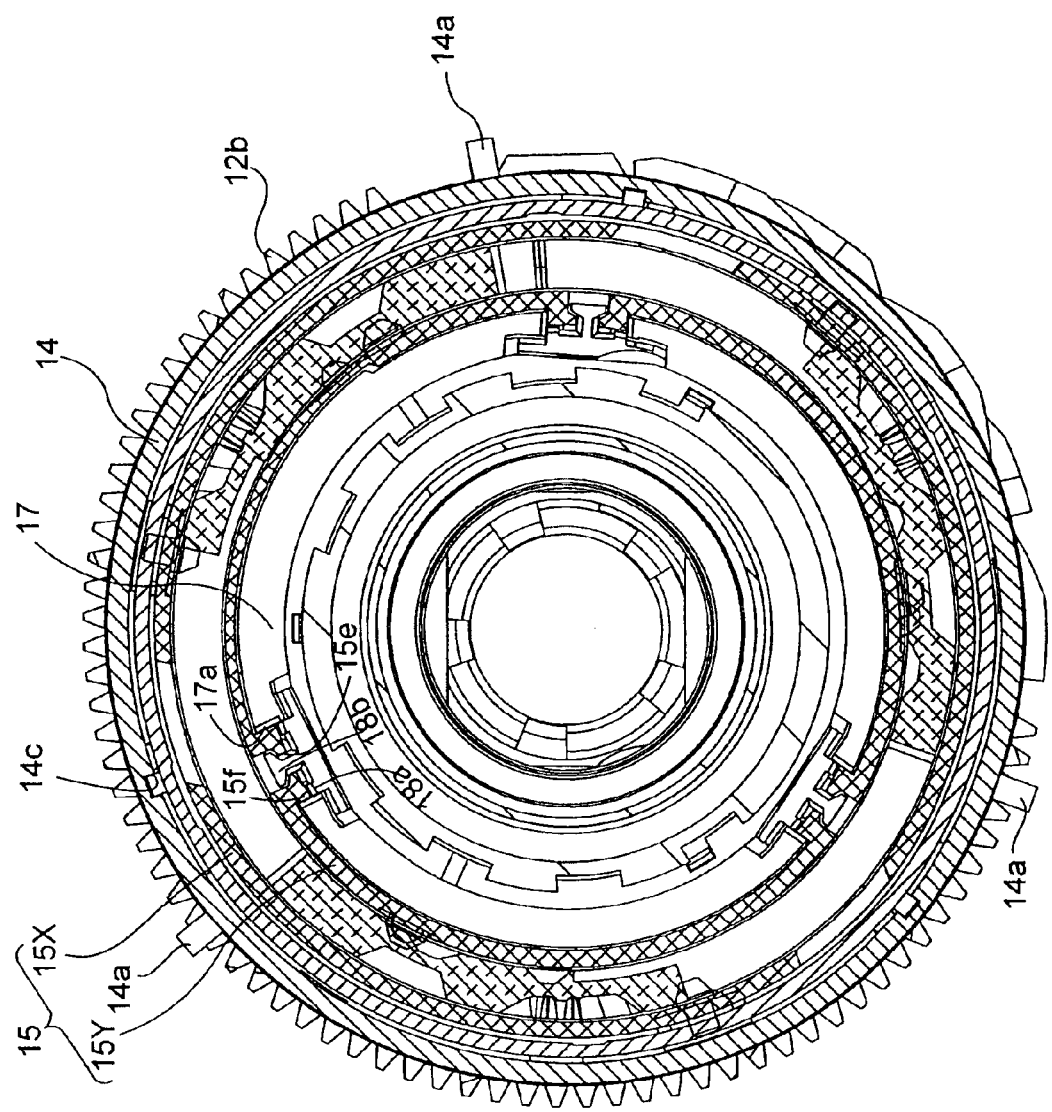
FIG. 6 is a transverse cross sectional view taken along VI—VI line shown in FIG. 3.
Figure 7:
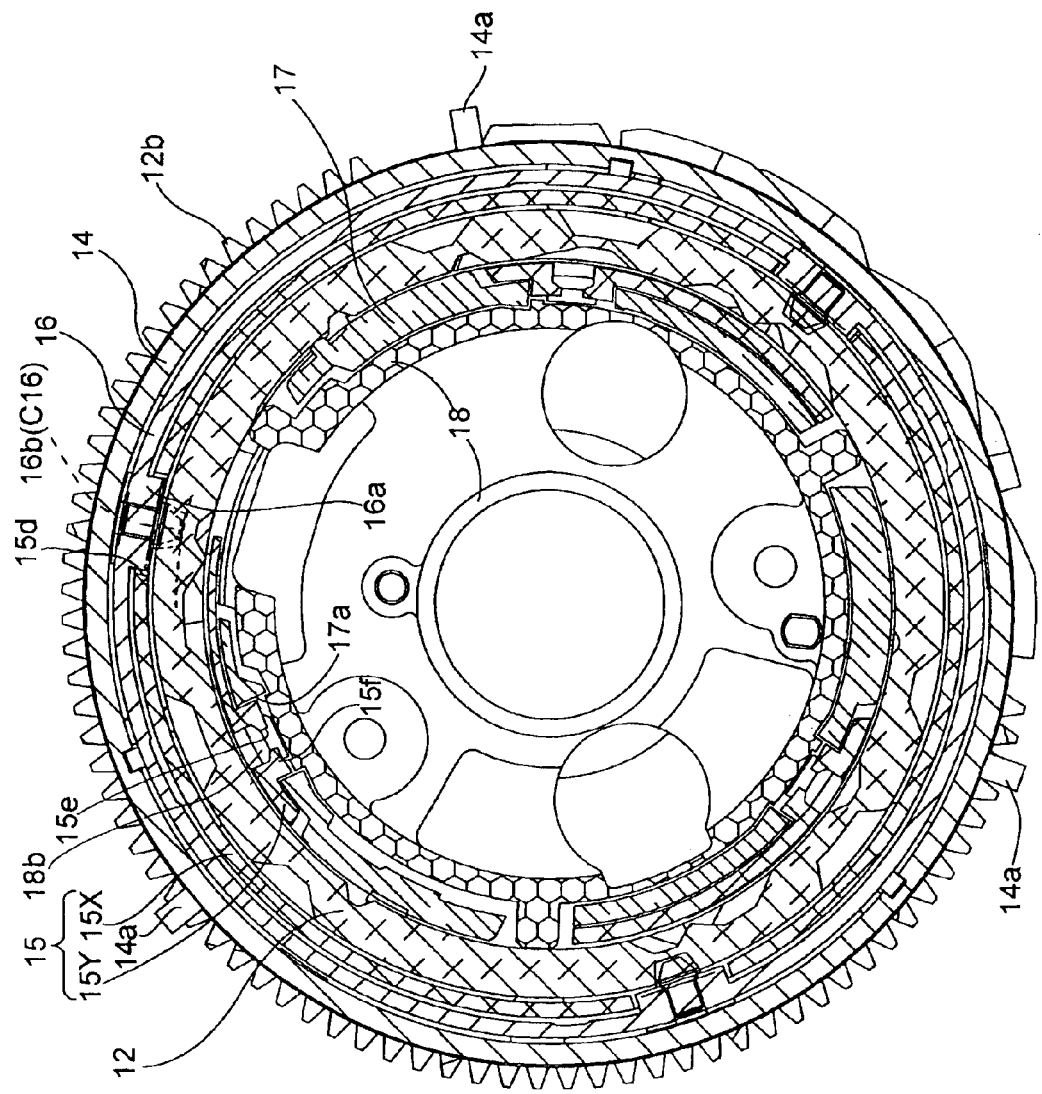
FIG. 7 is a transverse cross sectional view taken along VII—VII line shown in FIG. 3.
Figure 17:
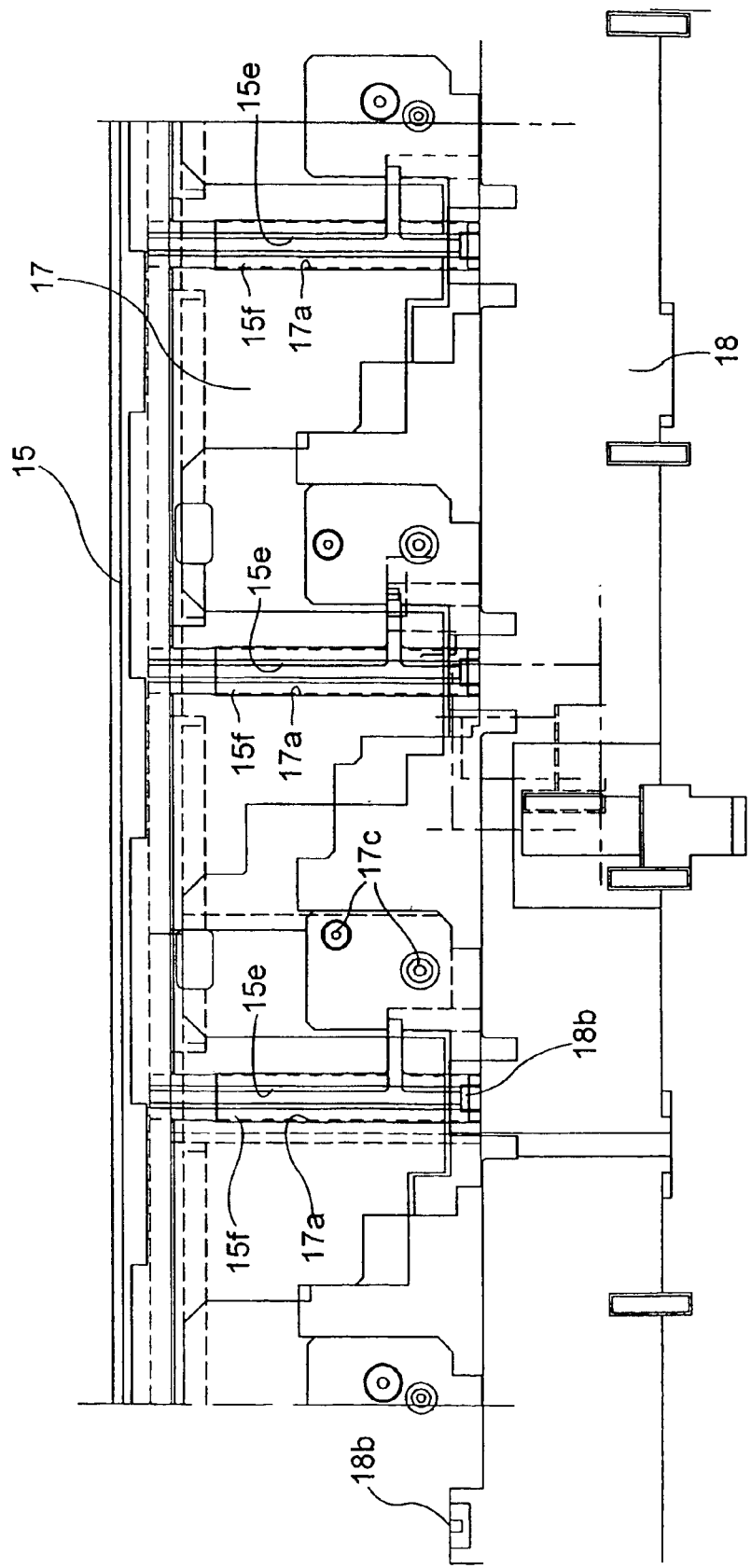
FIG. 17 is a developed view of the first lens group moving ring, the second lens group moving ring and the third lens group moving ring, showing linear guide mechanical linkages among the first through third lens group moving rings.
Figure 18:
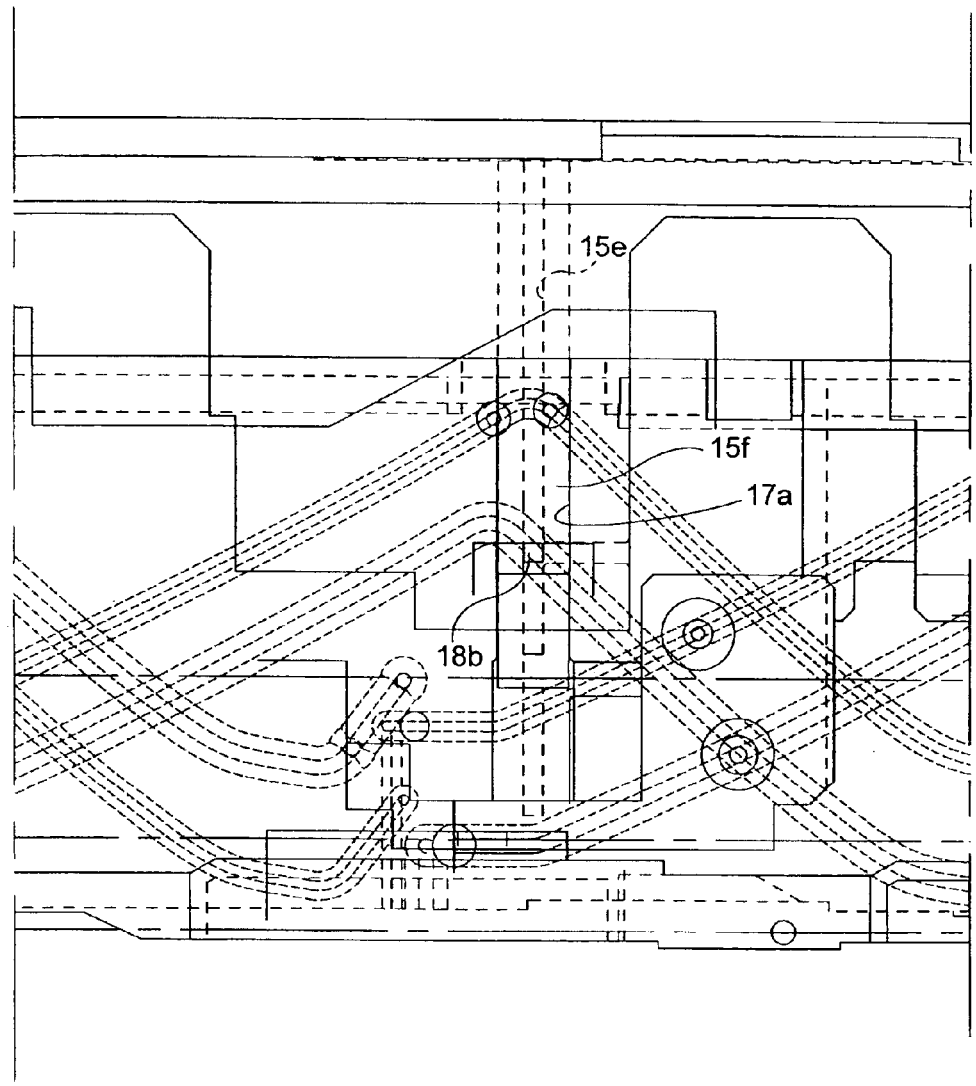
FIG. 18 is an enlarged view of a portion of the developed view shown in FIG. 17.
Figure 19:
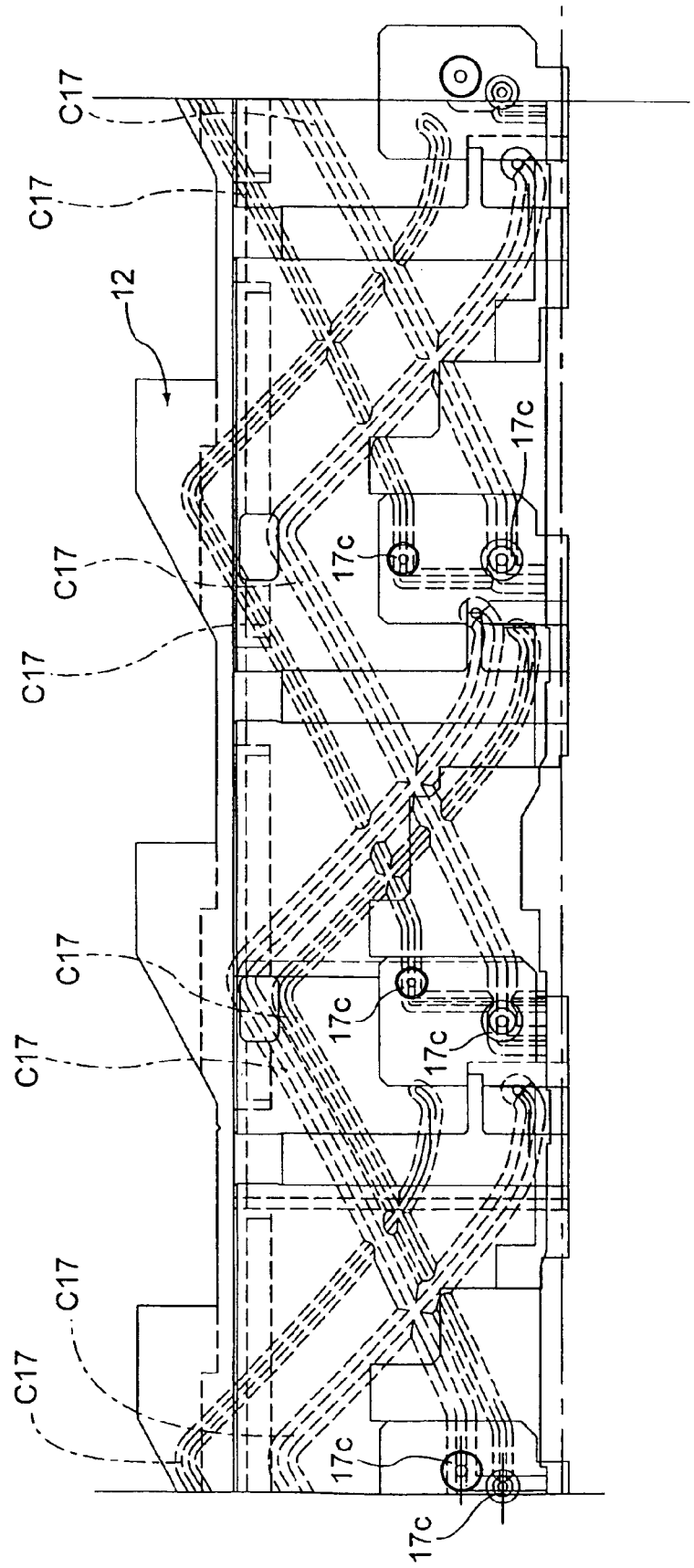
FIG. 19 is a developed view of the cam/helicoid ring, showing the shapes of a set of second cam grooves of the cam/helicoid ring for moving the second lens group.

The inner ring portion 15Y of the first lens group moving ring 15 is provided on an inner peripheral surface thereof with a set of three linear guide projections 15f which are elongated in a direction parallel to the optical axis O, while the second lens group moving ring 17 is provided with a set of three linear guide slots (linear guide through-slots) 17a which are elongated in a direction parallel to the optical axis O to be engaged with the set of three linear guide projections 15f to be freely slidable relative thereto along the optical axis O (see FIGS. 6, 7 and 17). Each linear guide projection 15f is provided along a substantially center thereof with a hanging groove 15e which is elongated in a direction parallel to the optical axis O and which has a substantially T-shaped cross section as shown in FIG. 6. The three linear guide projections 15f and the three linear guide slots 17a constitute a first linear guide mechanism. The rear end of each hanging groove 15e is closed (see FIGS. 17 and 18). The second lens group moving ring 17 is provided on an outer peripheral surface thereof with six cam followers 17c which are engaged in the set of six second cam grooves C17 of the cam/helicoid ring 12, respectively.

Figure 11:
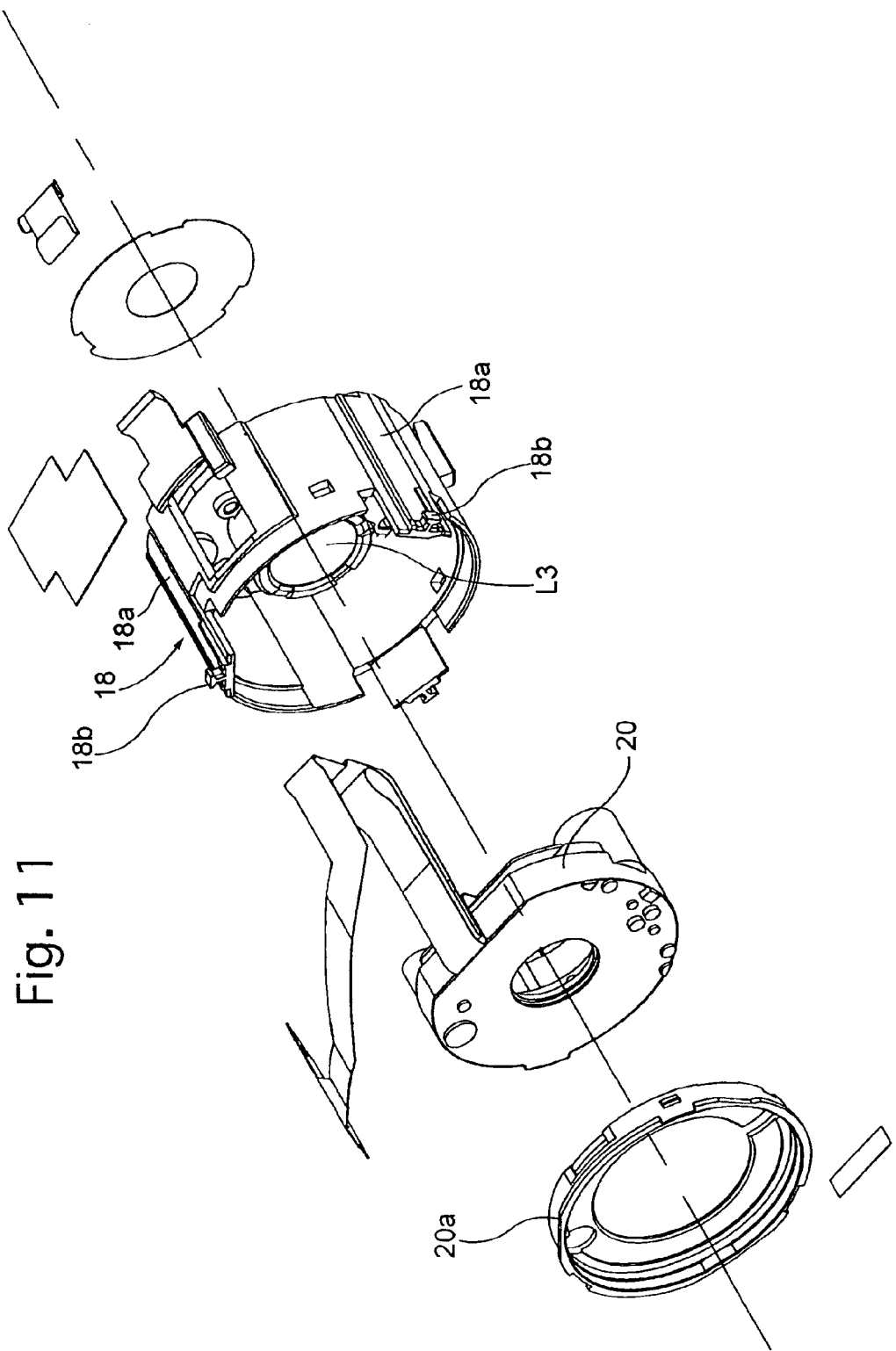
FIG. 11 is an exploded perspective view of a portion of the zoom lens barrel shown in FIG. 3, showing a third lens group moving ring and peripheral elements.

The zoom lens barrel 10 is provided inside the second lens group moving ring 17 with a third lens group moving ring (third lens frame) 18 which supports the third lens group L3. The third lens group moving ring 18 is provided on an outer peripheral surface thereof with a set of three linear guide projections 18a which are elongated in a direction parallel to the optical axis O to be engaged in the set of three linear guide slots 17a of the second lens group moving ring 17 to be freely slidable relative thereto along the optical axis O, respectively. The third lens group moving ring 18 is provided on a center of each linear guide projection 18a at the front end thereof with a linear moving key (stop projection) 18b (see FIGS. 11, 17 and 18) which has a substantially T-shaped cross section to be engaged in the associated hanging groove 15e. The three linear guide projections 15f, the three hanging groove 15e and the three linear moving keys 18b constitute a second linear guide mechanism. Furthermore, the three linear guide slots 17a and the three linear guide projections 18a constitute a third linear guide mechanism. As shown in FIG. 11, the zoom lens barrel 10 is provided with a shutter unit 20 which is inserted into the third lens group moving ring 18 to be positioned in front of the third lens group L3. The shutter unit 20 is fixed to the third lens group moving ring 18 by a fixing ring 20a. The zoom lens barrel 10 is provided between the third lens group moving ring 18 (the fixing ring 20a) and the second lens group moving ring 17 with a compression coil spring 21 which continuously biases the third lens group moving ring 18 rearwards relative to the second lens group moving ring 17. The rear limit of this rearward movement of the third lens group moving ring 18 relative to the second lens group moving ring 17 is determined by the three linear moving keys 18b contacting the closed rear ends of the three hanging grooves 15e, respectively. Namely, when the zoom lens barrel 10 is in a ready-to-photograph position, each linear moving key 18b remains in contact with the rear end of the associated hanging groove 15e of the first lens group moving ring 15 to keep the distance between the first lens group L1 and the third lens group L3 constant. When the zoom lens barrel 10 changes from a ready-to-photograph state to the retracted state shown in FIG. 3, a further rearward movement of the first lens group L1 in accordance with contours of the set of three first cam grooves C15, after the third lens group L3 (the third lens group moving ring 18) has reached the mechanical rear moving limit thereof, causes the first lens group L1 to approach the third lens group L3 while compressing the compression coil spring 21 (see FIG. 1). Each linear moving key 18b is formed so that the radially outer end thereof bulges to be prevented from coming off the associated hanging groove 15e.

Figure 12:
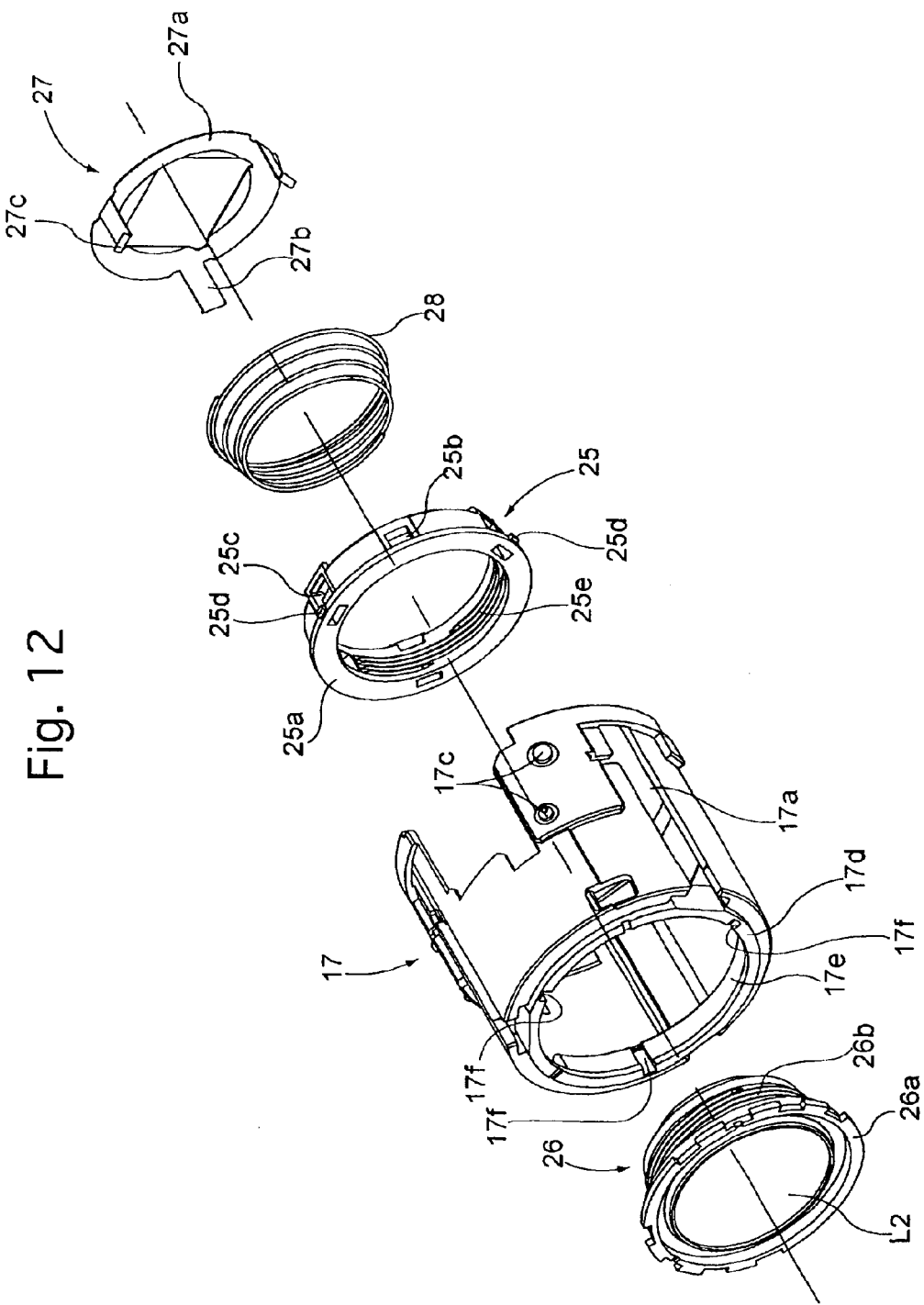
FIG. 12 is an exploded perspective view of a portion of the zoom lens barrel shown in FIG. 3, showing a second lens group moving ring and peripheral elements.
Figure 13:
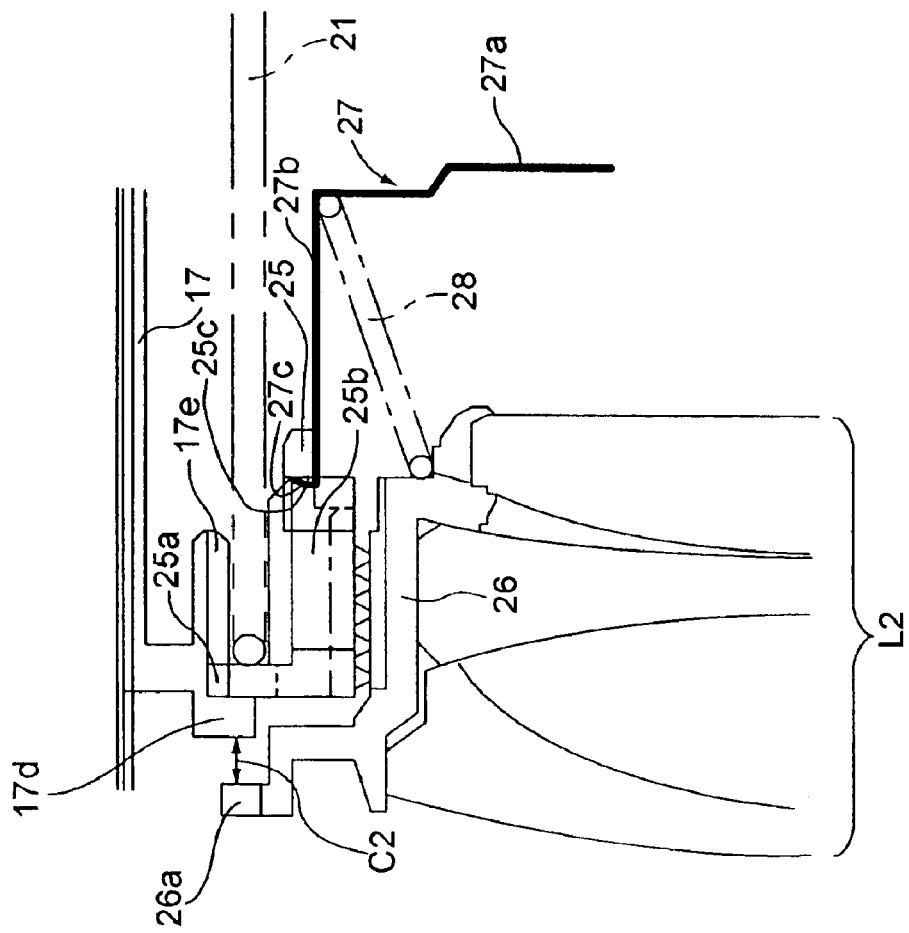
FIG. 13 is a longitudinal view of a portion of the zoom lens barrel shown in FIG. 3, showing a portion of the second lens group moving ring and peripheral elements.
Figure 14:
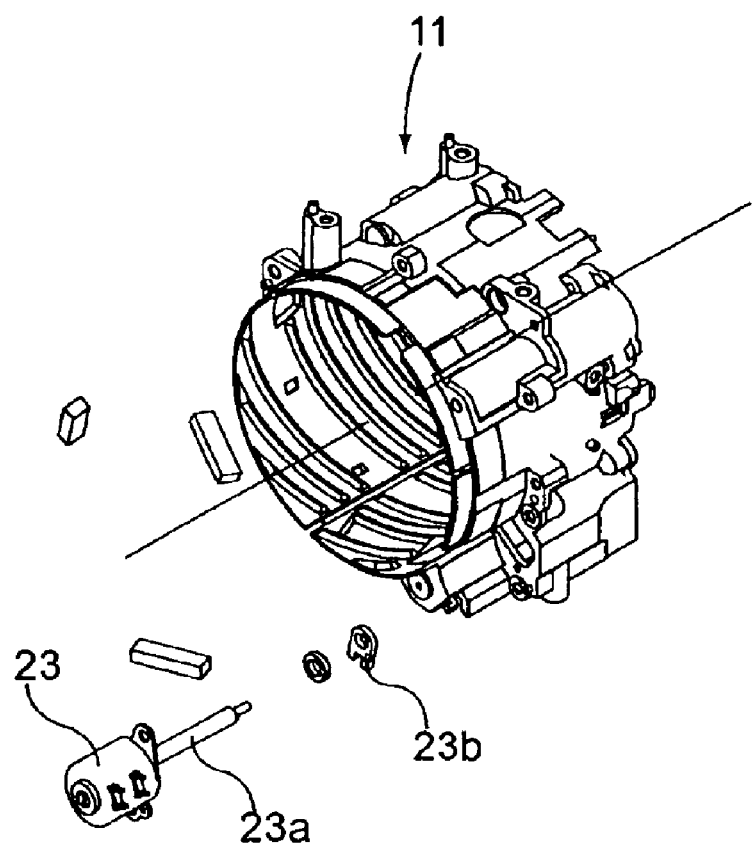
FIG. 14 is an exploded perspective view of a portion of the zoom lens barrel shown in FIG. 3, showing a stationary barrel, a pulse motor supported by the stationary barrel, and peripheral elements, seen from the rear side thereof.

Although a biasing force of the compression coil spring 21 can be applied directly to the second lens group moving ring 17 (i.e., although the second lens group L2 can be fixed to the second lens group moving ring 17), the second lens group L2 is made to be capable of moving rearward relative to the second lens group moving ring 17 for the purpose of further reduction in length of the zoom lens barrel 10 in the retracted state thereof in the present embodiment of the zoom lens barrel. FIGS. 12 and 13 show this structure for the further reduction in length of the zoom lens barrel 10. The second lens group moving ring 17 is provided at the front end thereof with a cylindrical portion 17e having an inner flange 17d. Three linear guide grooves 17f, which extend parallel to the optical axis direction and open at the front and rear ends thereof, are formed at equi-angular intervals on the cylindrical portion 17e. The zoom lens barrel 10 is provided inside the second lens group moving ring 17 with an intermediate ring 25. The intermediate ring 25 is provided at the front end thereof with a flange portion 25a which is fitted in the cylindrical portion 17e to be freely slidable on the cylindrical portion 17e in the optical axis direction. An end portion of the compression coil spring 21 abuts against the flange portion 25a, so that the flange portion 25a presses against the inner flange 17d due to the resiliency of the compression coil spring 21. Three guide projections 25d which radially extend outwards are provided on the outer peripheral surface of the flange portion 25a. The three guide projection 25d are respectively engaged with the three linear guide grooves 17f of the second lens group moving ring 17 from the rear side of the second lens group moving ring 17. Accordingly, the intermediate ring 25 is prevented from rotating about the optical axis with respect to the second lens group moving ring 17, and can only relatively move in the optical axis direction. The front face of the flange portion 25a can move forwards until sliding contact is made with the rear face of the inner flange 17d. The zoom lens barrel L2 is provided inside the second lens group moving ring 17 with a second lens group support frame 26 to which the second lens group L2 is fixed. A male thread 26b of the second lens group support frame 26 is screwed into female thread 25e formed on the inner periphery of the intermediate ring 25. Accordingly, the position of the second lens group L2 relative to the intermediate ring 25 which is prevented from rotating about the optical axis can be adjusted in the optical axis direction (zooming adjustment) by rotating the second lens group support frame 26 relative to the intermediate ring 25. After this adjustment, the second lens group support frame 26 can be permanently fixed to the intermediate ring 25 by putting drops of an adhesive agent into a radial through hole 25b formed on the intermediate ring 25. The second lens group support frame 26 is provided on an outer peripheral surface thereof with an outer flange 26a, and a clearance C2 (see FIG. 13) for the zooming adjustment exits between a front end surface of the inner flange 17d and the outer flange 26a. The compression coil spring 21 biases the intermediate ring 25 forward, and the intermediate ring 25 is held at a position where the flange portion 25a contacts with the inner flange 17d when the zoom lens barrel 10 is in a ready-to-photograph state. Namely, on the one hand, the position of the second lens group L2 is controlled by the set of six second cam grooves C17 when the zoom lens barrel 10 is in a ready-to-photograph state; on the other hand, the second lens group support frame 26 is pushed rearward mechanically by the rear end of the first lens group support frame 24 to thereby move the outer flange 26a of the second lens group support frame 26 rearward to a point where the outer flange 26a contacts with the inner flange 17d when the zoom lens barrel 10 is retracted to the retracted position thereof. This reduces the length of the zoom lens barrel 10 by a length corresponding to the clearance C2.

The zoom lens barrel 10 is provided immediately behind the intermediate ring 25 with a light shield ring 27 which is supported by the intermediate ring 25. As shown in FIG. 12, the light shield ring 27 is provided with a ring portion 27a and a set of three leg portions 27b which extend forward from the ring portion 27a at intervals of approximately 120 degrees. Each leg portion 27b is provided at the front end thereof with a hook portion 27c which is formed by bending the tip of the leg portion 27b radially outwards. The intermediate ring 25 is provided on an outer peripheral surface thereof with a set of three engaging holes 25c with which the hook portions 27c of the set of three leg portions 27b are engaged, respectively (see FIG. 12). The zoom lens barrel 10 is provided between the light shield ring 27 and the second lens group support frame 26 with a compression coil spring 28 having a substantially truncated conical shape which continuously biases the light shield ring 27 rearwards. When the zoom lens barrel 10 is retracted toward the retracted position, the light shield ring 27 approaches the second lens group support frame 26 while compressing the compression coil spring 28 after reaching the rear moving limit of the light shield ring 27. The lengths of the set of three engaging holes 25c in the optical axis direction are determined to allow the ring portion 27a to come into contact with the second lens group support frame 26.

The compression coil spring 28 also serves as a device for removing backlash between the intermediate ring 25 and the second lens group support frame 26 when the second lens group support frame 26 is rotated relative to the intermediate ring 25 for the aforementioned zooming adjustment. The zooming adjustment is performed by rotating the second lens group support frame 26 relative to the intermediate ring 25 to adjust the position of the second lens group L2 in the optical axis direction relative to the intermediate ring 25 while viewing the position of an object image. This zooming adjustment can be performed with precision with backlash between the intermediate ring 25 and the second lens group support frame 26 being removed by the compression coil spring 28.

The zoom lens barrel 10 is provided behind the third lens group moving ring 18 with a fourth lens group support frame 22 to which the fourth lens group L4 is fixed. As described above, the fourth lens group L4 is moved to make a slight focus adjustment to the vari-focal lens system to adjust a slight focal deviation thereof while the first through third lens groups L1, L2 and L3 are moved relative to one another to vary the focal length of the zoom lens system, and is also moved as a focusing lens group. The fourth lens group L4 is moved along the optical axis O by rotation of a pulse motor 23 (see FIGS. 5 and 14). The pulse motor 23 is provided with a rotary screw shaft 23a. A nut member 23b is screwed on the rotary screw shaft 23a to be prevented from rotating relative to the stationary barrel 11. The nut member 23b is continuously biased by an extension coil spring S in a direction to contact with a leg portion 22a which projects radially outwards from the fourth lens group support frame 22 (see FIGS. 5 and 15). The fourth lens group support frame 22 is prevented from rotating by guide bars 22b, which extend in direction parallel to the optical axis direction, which are slidably engaged with radial projecting followers 22c which extend radially outwards from the fourth lens group support frame 22 (see FIGS. 2 and 15). Accordingly, rotations of the pulse motor 23 forward and reverse cause the fourth lens group support frame 22 (the fourth lens group L4) to move forward and rearward along the optical axis O, respectively. Rotations of the pulse motor 23 are controlled in accordance with information on focal length and/or information on object distance.

Accordingly, in the above described embodiment of the zoom lens barrel, rotating the cam/helicoid ring 12 by rotation of the drive pinion 13 causes the first lens group moving ring 15, the exterior ring 16 and the second lens group moving ring 17 to move along the optical axis O in accordance with contours of the set of three first cam grooves C15, the set of three third cam grooves C16 and the set of six second cam grooves C17, respectively. When the first lens group moving ring 15 moves forward from the retracted position, firstly the three linear moving keys 18b contact the rear ends of the three hanging grooves 15e, respectively, and subsequently the third lens group moving ring 18 moves together with the first lens group moving ring 15 with the three linear moving key 18b remaining in contact with the rear ends of the three hanging grooves 15e, respectively. The position of the fourth lens group L4 is controlled by the pulse motor 23, whose rotations are controlled in accordance with information on focal length, to make a slight focus adjustment to the vari-focal lens system to adjust a slight focal deviation thereof. As a result, reference moving paths as shown in FIG. 1 for performing a zooming operation are obtained. Rotations of the pulse motor 23 are also controlled in accordance with information on object distance to perform a focusing operation.

As described above, the present embodiment of the zoom lens barrel includes the first lens group L1, the second lens group L2, the third lens group L3 and the fourth lens group L4 in that order from the object side; the first lens group L1 and the third lens group L3 are moved along the optical axis O to vary the focal length of the zoom lens system. During this variation of focal length, the first lens group L1 and the third lens group L3 are integrally moved (i.e., with a constant distance therebewteen) along the optical axis O. In addition, the three cam followers 15a of the first lens group moving ring 15, which is positioned around the cam/helicoid ring 12 and supports the first lens group L1, are respectively engaged in the set of three first cam grooves C15 of the cam/helicoid ring 12, while the six cam followers 17c of the second lens group moving ring 17, which is positioned inside the cam/helicoid ring 12 and supports the second lens group L2, are respectively engaged in the set of six second cam grooves C17 of the cam/helicoid ring 12. Additionally, the first lens group moving ring 15 is linearly guided along the optical axis O by the linear guide ring 14, while the second lens group moving ring 17 is linearly guided along the optical axis O by the inner ring portion 15Y of the first lens group moving ring 15.

In addition, the second lens group support frame 26, to which the second lens group L2 is fixed, is screwed into the intermediate ring 25, the second lens group support frame 26 is cemented to the intermediate ring 25 after the aforementioned zooming adjustment is carried out, and the intermediate ring 25 is fitted in the second lens group moving ring 17 (the cylindrical portion 17e) to be freely slidable on the second lens group moving ring 17 (the cylindrical portion 17e) in the optical axis direction. The third lens group moving ring 18 is linearly guided inside the cam/helicoid ring 12 by the first lens group moving ring 15 with the set of three linear moving keys 18b which are positioned behind the second lens group moving ring 17 and are respectively slidably engaged in the set of three hanging grooves 15e of the inner ring portion 15Y so that the distance between the first lens group moving ring 15 and the third lens group moving ring 18 becomes maximum when the three linear moving keys 18b contact the closed rear ends of the three hanging grooves 15e.

The compression coil spring (biasing device) 21 is installed between the intermediate ring 25 and the third lens group moving ring 18 in a compressed fashion to bias the intermediate ring 25 and the third lens group moving ring 18 in opposite directions away from each other. Due to this structure, when the zoom lens barrel 10 is in a ready-to-photograph position, the forward moving limit of the second lens group support frame 26 relative to the second lens group moving ring 17 is determined by contact of the intermediate ring 25 which is biased forward by the compression coil spring 21 with a rear surface of the inner flange 17d of the second lens group moving ring 17 to form the clearance C2 (see FIG. 13) between the inner flange 17d of the second lens group moving ring 17 and the outer flange 26a of the second lens group support frame 26. On the other hand, when the zoom lens barrel 10 is fully retracted as shown in FIG. 3, the first lens group moving ring 15 presses the outer flange 26a of the second lens group support frame 26 rearward to move the second lens group support frame 26 rearward together with the intermediate ring 25 against the spring force of the compression coil spring 21 to thereby reduce the length of the zoom lens barrel 10. In the present embodiment of the zoom lens barrel, the first lens group moving ring 15 stops retracting at a position immediately before a rear surface of the outer flange 26a of the second lens group support frame 26 comes into contact with a front surface of the inner flange 17d (i.e., a position where a rear surface of the outer flange 26a does not contact with a front surface of the inner flange 17d) when the zoom lens barrel 10 is fully retracted as shown in FIG. 3. Accordingly, no pressing force by the first lens group moving ring 15 is exerted on the second lens group moving ring 17 when the zoom lens barrel 10 is in the retracted position. Accordingly, the first lens group moving ring 15 and the second lens group moving ring 17 can smoothly move along the optical axis O as the cam/helicoid ring 12 rotates.

The present invention can be applied not only to a retracting mechanism of a zoom lens barrel such as the above described retracting mechanism of the zoom lens barrel 10, but also to any other retracting mechanisms including a cam ring and a lens support ring, regardless of whether the cam ring includes a helicoid such as the male helicoid 12a of the cam/helicoid ring 12.

As can be understood from the foregoing, the retracting mechanism according to the present invention makes a further reduction in length of the zoom lens barrel possible.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A retracting mechanism of a zoom lens barrel including a first lens group, a second lens group and a third lens group, in that order from an object side, wherein said first lens group and said third lens group are integrally moved along an optical axis during a variation of a focal length, and wherein at least one of said first lens group and said third lens group is moved relative to the other to reduce a distance therebetween when said zoom lens barrel is fully retracted, said retracting mechanism comprising:

a first lens group moving ring, for supporting said first lens group, which is linearly guided along said optical axis;

a second lens group moving ring, for supporting said second lens group, which is linearly guided along said optical axis;

a third lens group moving ring, for supporting said third lens group, which is linearly guided along said optical axis, said third lens group moving ring being allowed to approach said first lens group moving ring and being prevented from moving away from said first lens group moving ring beyond a moving limit relative to said first lens group moving ring;

a cam mechanism for moving said first lens group moving ring and said second lens group moving ring in respective moving manners independent of each other along said optical axis;

a second lens group support frame which supports said second lens group;

an intermediate member which is supported by said second lens group moving ring to be movable along said optical axis while being prevented from moving forward beyond a forward moving limit of said second lens group support frame relative to said second lens group moving ring, said second lens group support frame being screw-engaged into said intermediate member; and a biasing device for biasing said third lens group moving ring in a direction away from said first lens group moving ring, wherein said biasing device functions between said intermediate member and said third lens group moving ring.

2. The retracting mechanism according to claim 1, wherein said second lens group moving ring comprises an inner flange which projects radially inwards, wherein said second lens group support frame comprises an outer flange which projects radially outwards, wherein said front forward moving limit of said second lens group support frame is determined by contact of said intermediate member, which is biased forward by said biasing device, with a rear surface of said inner flange when said zoom lens barrel is in a ready-to-photograph position, and wherein said first lens group moving ring presses said outer flange rearward to move said second lens group support frame rearward together with said intermediate member against a biasing force of said biasing device.

3. The retracting mechanism according to claim 1, wherein said second lens group serves as a lens group for a zooming adjustment, wherein said second lens group support frame, to which said second lens group is fixed, is fixed to said intermediate member upon a position of screw-engagement between said second lens group support frame and said intermediate member is adjusted.

4. The retracting mechanism according to claim 1, wherein said first lens group is a frontmost lens group of said zoom lens barrel.

5. The retracting mechanism according to claim 1, wherein said zoom lens barrel is a vari-focal type in which a focal point slightly varies when said focal length is varied, wherein said zoom lens barrel further includes a fourth lens group which is positioned behind said third lens group to be guided along said optical axis, and wherein said fourth lens group is moved along said optical axis to make an adjustment to a slight focus deviation caused by said variation of said focal length.

6. The retracting mechanism according to claim 5, wherein said first lens group, said second lens group, said third lens group and said fourth lens group are a positive lens group, a negative lens group, a positive lens group and a positive lens group, respectively.

7. The retracting mechanism according to claim 5, wherein said fourth lens group is moved along said optical axis to perform a focusing operation.

8. The retracting mechanism according to claim 1, wherein said cam mechanism comprises:

a cam ring which is positioned around said second lens group moving ring to be rotatable relative to said second lens group moving ring, and includes a plurality of outer cam grooves formed on an outer peripheral surface of said cam ring, and a plurality of inner cam grooves formed on an inner peripheral surface of said cam ring;

a plurality of inward cam followers which project radially inwards from said first lens group moving ring to be engaged in said plurality of outer cam grooves, respectively; and a plurality of outward cam followers which project radially outwards from said second lens group moving ring to be engaged in said plurality of inner cam grooves, respectively.

9. The retracting mechanism according to claim 1, further comprising a linear guide mechanism, positioned between said second lens group moving ring and said intermediate member, for guiding said intermediate member linearly along said optical axis without rotating said intermediate member relative to said second lens group moving ring.

* * * * *